US012743576B2

(12) United States Patent
Blumenfeld et al.

(10) Patent No.: US 12,743,576 B2
(45) Date of Patent: Sep. 22, 2026

(54) SYSTEM AND METHOD FOR CREATION AND HANDLING OF CONFIGURABLE APPLICATIONS FOR WEBSITE BUILDING SYSTEMS

(71) Applicant: Wix.com Ltd., Tel Aviv (IL)

(72) Inventors: Uval Arie Blumenfeld, Ra'anana (IL); Or Fattal, Tel Aviv (IL); Avi Marcus, Haifa (IL); Hannah Waxman, Tel Aviv (IL); Karin Agan, Tel Aviv (IL); Maor Yosef, Kfar Yona (IL); Amit Kaufman, Tel Aviv (IL); Itai Chejanovsky, Petach Tikva (IL); Omer Ganim, Petach Tikva (IL); Lior Shefer, Brooklyn, NY (US); Or-Avraham Ben-Ari, Tel Aviv (IL); Nathalie Aharon, Netanya (IL); Noam Shalev Inbar, Tel Aviv (IL); Itay Shtekel, Moshav Tirat Yehuda (IL); Tzufit Barzilay, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 123 days.

(21) Appl. No.: 18/349,187

(22) Filed: Jul. 10, 2023

(65) Prior Publication Data

US 2023/0359814 A1 Nov. 9, 2023

Related U.S. Application Data

(63) Continuation of application No. 16/683,338, filed on Nov. 14, 2019, now Pat. No. 11,698,944.

(Continued)

(51) Int. Cl.

*G06F 40/186* (2020.01)
*G06F 9/54* (2006.01)

(Continued)

(52) U.S. Cl.

CPC ............ *G06F 40/186* (2020.01); *G06F 9/547* (2013.01); *G06F 40/174* (2020.01); *G06F 40/197* (2020.01)

(58) Field of Classification Search

CPC combination set(s) only.
See application file for complete search history.

(56) References Cited

U.S. PATENT DOCUMENTS 5,644,611 A * 7/1997 McShane ............. H04N 1/3875 382/282
6,016,438 A * 1/2000 Wakayama ............. G06T 19/00 324/309

(Continued)

FOREIGN PATENT DOCUMENTS

JP 2012520509 A 9/2012
WO 2018020462 A1 2/2018

OTHER PUBLICATIONS

International Search Report for corresponding PCT application PCT/IB2019/59789 mailed on Mar. 18, 2020.

(Continued)

*Primary Examiner* — Nicholas Augustine
(74) *Attorney, Agent, or Firm* — Heidi Brun Associates Ltd.; Heidi M. Brun

(57) ABSTRACT

A website building system (WBS) includes a database of website components and definitions and instances of website building system configurable applications (WCAs), where the WCAs are single packaged entities which can also be accessed as a sets of customizable elements; a WCA app builder to enable a developer to develop a first version WCA; an in-site editor to provide specific editing capabilities for a user to edit at least one of a definition or an instance of the first version WCA and a WCA handler to receive a modification to the first version WCA from the user and an update to the first version WCA from the developer, the (Continued)

WCA handler to merge between the modification and the update to create a changed WCA, to resolve conflicts or loss of functionality and to handle permissions between the modification and the update.

14 Claims, 13 Drawing Sheets

Related U.S. Application Data

(60) Provisional application No. 62/927,703, filed on Oct. 30, 2019, provisional application No. 62/760,965, filed on Nov. 14, 2018.

(51) Int. Cl.
*G06F 40/174* (2020.01)
*G06F 40/197* (2020.01)

(56) References Cited

U.S. PATENT DOCUMENTS 6,049,622 A * 4/2000 Robb .................... G06T 19/003 715/810
6,108,573 A * 8/2000 Debbins ................ G01R 33/54 345/157
6,111,573 A * 8/2000 McComb .............. G09G 5/363 715/764
6,182,127 B1 * 1/2001 Cronin, III .......... G06F 16/9577 709/200
6,502,114 B1 * 12/2002 Forcier ................ G06F 3/0488 715/273
6,510,459 B2 * 1/2003 Cronin, III .......... G06F 16/9577 709/200
7,034,860 B2 * 4/2006 Lia ........................ H04N 7/152 709/204
7,417,644 B2 * 8/2008 Cooper .................. G06F 9/451 345/619
7,676,763 B2 * 3/2010 Rummel .............. G06F 3/0482 715/845
7,730,425 B2 * 6/2010 de los Reyes .......... G06F 9/451 715/834
8,245,156 B2 * 8/2012 Mouilleseaux ..... G06F 3/04883 715/834
8,279,174 B2 * 10/2012 Jee ...................... H04M 1/0268 345/157
8,340,726 B1 * 12/2012 Fujisaki ................. G06F 3/165 345/169
8,381,133 B2 * 2/2013 Iwema .................. G06F 3/0488 715/845
8,549,432 B2 * 10/2013 Warner .............. G06F 3/04817 715/834
8,601,389 B2 * 12/2013 Schulz ................. G06F 3/0482 715/810
8,817,053 B2 * 8/2014 Robert ................ G06F 3/04842 715/764
9,436,765 B2 9/2016 Abrahami
9,747,258 B2 8/2017 Ben-Aharon
9,753,911 B2 9/2017 Goldstein
9,817,804 B2 11/2017 Goldstein
9,996,566 B2 6/2018 Ben-Aharon
10,073,923 B2 9/2018 Koren
10,169,307 B2 1/2019 Abrahami
10,176,154 B2 1/2019 Ben-Aharon
10,180,714 B1 * 1/2019 Kin ..................... G06F 3/04883
10,185,703 B2 1/2019 Abrahami
10,209,966 B2 2/2019 Abrahami
10,326,821 B2 6/2019 Abrahami
10,397,305 B1 8/2019 Abrahami
10,459,699 B2 10/2019 Geva
10,521,278 B2 * 12/2019 Anima ................. G06F 40/169
11,698,944 B2 7/2023 Blumenfeld
2003/0011638 A1 * 1/2003 Chung .................. G06F 3/0482 715/808
2004/0006543 A1 * 1/2004 Twining ............... G06Q 50/188 705/80
2004/0088647 A1 * 5/2004 Miller ..................... G06F 40/12 715/234
2004/0230940 A1 * 11/2004 Cooper .................. G06F 9/451 717/162
2005/0091596 A1 * 4/2005 Anthony ................ G11B 27/34 715/848
2005/0228250 A1 * 10/2005 Bitter ..................... A61B 34/20 600/407
2005/0251021 A1 * 11/2005 Kaufman ................. A61B 6/00 600/407
2005/0278647 A1 * 12/2005 Leavitt ................ G06F 3/04817 715/779
2006/0013462 A1 * 1/2006 Sadikali ................. G16H 30/40 382/128
2006/0031462 A1 2/2006 Xing et al.
2006/0034237 A1 * 2/2006 Patrick .................... G06F 15/16 370/352
2007/0028174 A1 * 2/2007 Moore .................. G06F 9/5072 715/764
2007/0130519 A1 * 6/2007 Tilford .................. G06F 40/166 715/236
2007/0176898 A1 * 8/2007 Suh ................... H04M 1/72469 345/158
2007/0180397 A1 * 8/2007 Hoyer ................. G06F 3/04886 715/780
2007/0240037 A1 * 10/2007 Law-How-Hung .......................... G06F 3/0482 707/E17.116
2008/0010591 A1 * 1/2008 Good .................... G06F 40/174 715/764
2008/0036743 A1 * 2/2008 Westerman ............. G06F 3/038 345/173
2008/0218533 A1 * 9/2008 Goto ................. H04M 1/72403 345/661
2009/0222416 A1 * 9/2009 Tymoshenko ...... G06F 16/9566
2009/0309849 A1 * 12/2009 Iwema .................. G06F 3/0488 345/173
2009/0327964 A1 * 12/2009 Mouilleseaux ..... G06F 3/04883 715/834
2010/0071026 A1 * 3/2010 Poulsen .................... G06F 8/38 715/781
2010/0192103 A1 * 7/2010 Cragun ................. G06F 3/0488 715/834
2010/0223560 A1 * 9/2010 Shenfield ................ H04L 67/55 709/224
2010/0229090 A1 * 9/2010 Newton ............. G06F 3/04883 715/764
2010/0306702 A1 * 12/2010 Warner ................. G06F 3/0482 715/834
2011/0154268 A1 * 6/2011 Trent, Jr. ................ G06F 3/017 715/863
2011/0164058 A1 * 7/2011 Lemay ................ G06F 3/04883 345/173
2011/0307798 A1 12/2011 Lezama Guadarrama
2012/0013540 A1 * 1/2012 Hogan .................. G06F 40/177 345/173
2013/0117657 A1 * 5/2013 Verlaan ................. G06F 40/186 715/234
2013/0132875 A1 5/2013 Allen
2013/0167012 A1 * 6/2013 Fischer ................. G06F 40/186 715/234
2013/0198609 A1 8/2013 Mokhtarzada
2013/0212541 A1 * 8/2013 Dolenc ................. G06F 3/0488 715/863
2014/0033018 A1 * 1/2014 Pallai .................... G06F 16/972 715/234
2014/0181206 A1 * 6/2014 Underwood .......... G06F 16/958 709/204
2014/0258841 A1 * 9/2014 Strong .................... G06F 40/14 715/234
2014/0258842 A1 * 9/2014 Strong .................. G06F 40/186 715/234

(56) References Cited

U.S. PATENT DOCUMENTS

2014/0282218 A1 9/2014 Kaufman
2014/0282452 A1* 9/2014 Di Flora ............... G06F 9/4484 717/153
2015/0074546 A1* 3/2015 Slawson ................... G06F 8/65 715/747
2015/0082292 A1 3/2015 Thomas
2015/0143226 A1* 5/2015 Greaves ................ G06F 16/951 715/234
2015/0154164 A1 6/2015 Goldstein
2015/0222676 A1* 8/2015 Davar ..................... G06F 16/95 715/738
2015/0227533 A1* 8/2015 Goldstein ........... G06F 16/2379 707/661
2015/0310124 A1* 10/2015 Ben-Aharon ......... G06F 40/186 715/205
2016/0357527 A1* 12/2016 Geva ......................... G06F 8/38
2016/0378737 A1 12/2016 Keslin
2017/0124048 A1* 5/2017 Campbell ............... G06F 40/18
2017/0124054 A1* 5/2017 Campbell ............... G06F 40/18
2018/0032626 A1 2/2018 Ben-Aharon
2018/0174229 A1* 6/2018 Sherwin ............. G06Q 30/0643
2018/0181375 A1* 6/2018 Hermet-Chavanne ....................... G06F 9/548
2018/0293323 A1 10/2018 Abrahami
2019/0026082 A1 1/2019 Shalev
2019/0026280 A1 1/2019 Aviyam
2019/0095255 A1* 3/2019 Anima .................... G06F 40/18
2019/0213057 A1* 7/2019 Nitta ....................... G06F 9/541
2019/0222634 A1* 7/2019 Jones .................... G06F 9/4856
2019/0266076 A1* 8/2019 Maliani ............... G06F 11/3684
2020/0184149 A1* 6/2020 Honsowetz ........... G06F 40/211

OTHER PUBLICATIONS

Preliminary Search Report for corresponding Brazilian application BR112021009093-2 mailed on May 30, 2026.

* cited by examiner

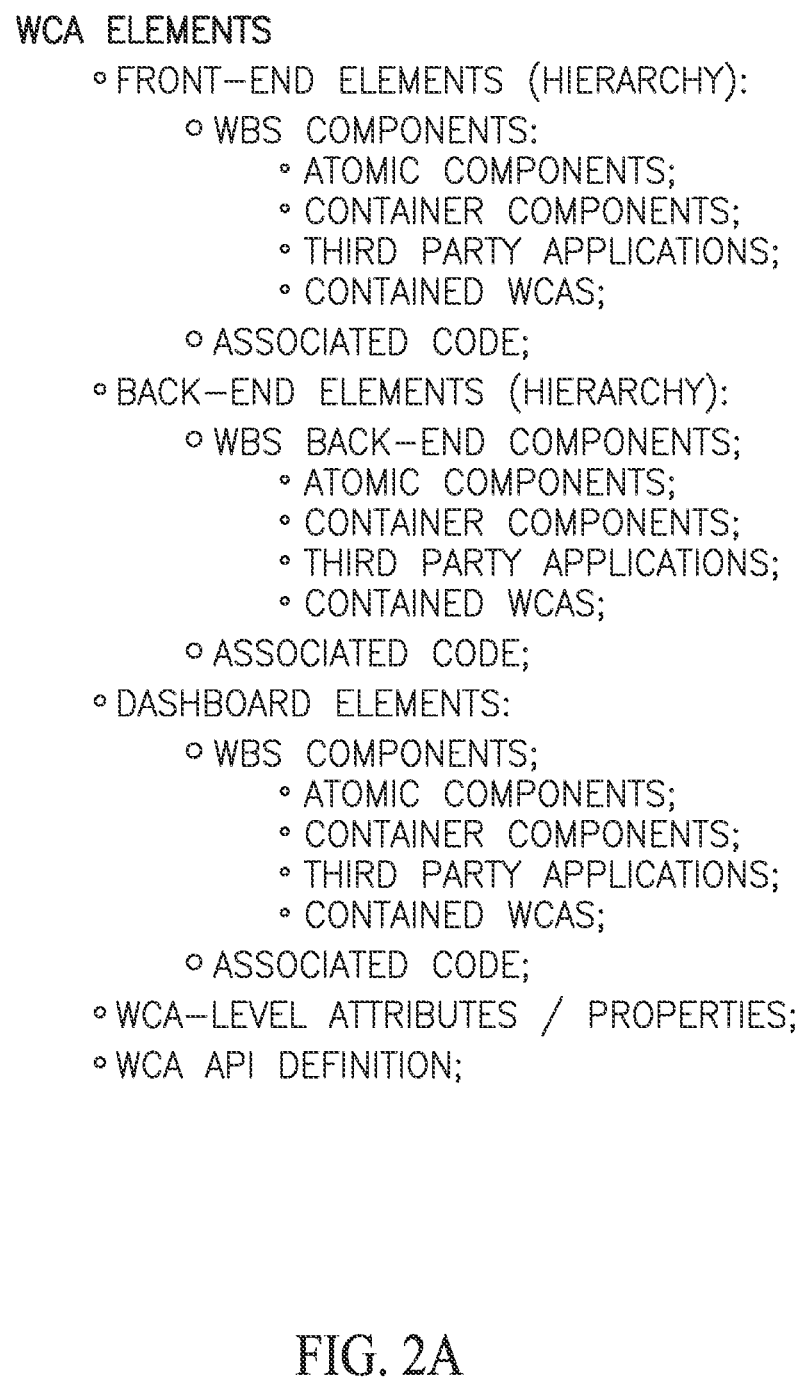

WCA ELEMENTS

- FRONT-END ELEMENTS (HIERARCHY):
  - WBS COMPONENTS:
    - ATOMIC COMPONENTS;
    - CONTAINER COMPONENTS;
    - THIRD PARTY APPLICATIONS;
    - CONTAINED WCAS;
  - ASSOCIATED CODE;
- BACK-END ELEMENTS (HIERARCHY):
  - WBS BACK-END COMPONENTS;
    - ATOMIC COMPONENTS;
    - CONTAINER COMPONENTS;
    - THIRD PARTY APPLICATIONS;
    - CONTAINED WCAS;
  - ASSOCIATED CODE;
- DASHBOARD ELEMENTS:
  - WBS COMPONENTS;
    - ATOMIC COMPONENTS;
    - CONTAINER COMPONENTS;
    - THIRD PARTY APPLICATIONS;
    - CONTAINED WCAS;
  - ASSOCIATED CODE;
- WCA-LEVEL ATTRIBUTES / PROPERTIES;
- WCA API DEFINITION;

FIG. 2A

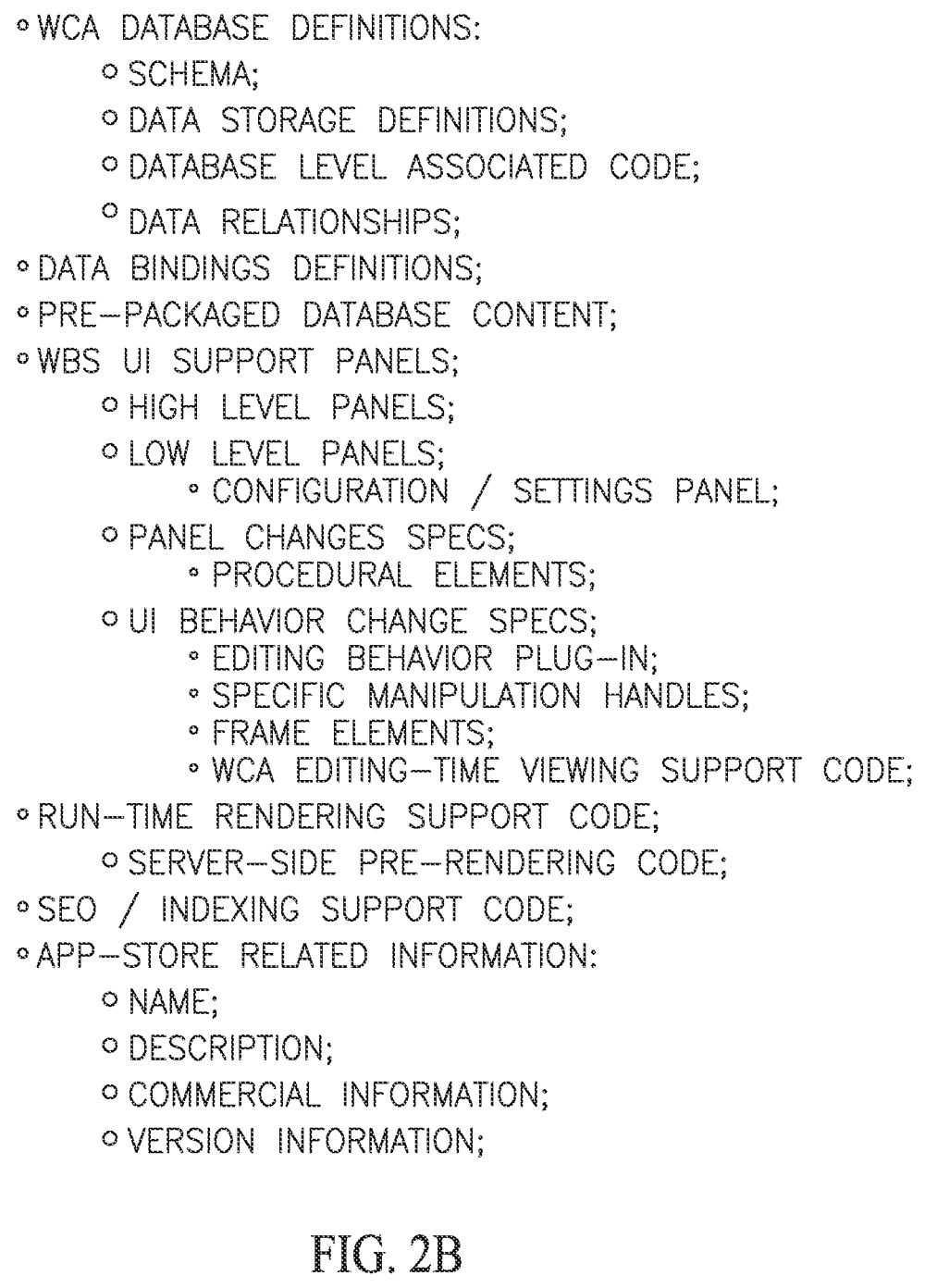

- WCA DATABASE DEFINITIONS:
  - SCHEMA;
  - DATA STORAGE DEFINITIONS;
  - DATABASE LEVEL ASSOCIATED CODE;
  - DATA RELATIONSHIPS;
- DATA BINDINGS DEFINITIONS;
- PRE-PACKAGED DATABASE CONTENT;
- WBS UI SUPPORT PANELS;
  - HIGH LEVEL PANELS;
  - LOW LEVEL PANELS;
    - CONFIGURATION / SETTINGS PANEL;
  - PANEL CHANGES SPECS;
    - PROCEDURAL ELEMENTS;
  - UI BEHAVIOR CHANGE SPECS;
    - EDITING BEHAVIOR PLUG-IN;
    - SPECIFIC MANIPULATION HANDLES;
    - FRAME ELEMENTS;
    - WCA EDITING-TIME VIEWING SUPPORT CODE;
- RUN-TIME RENDERING SUPPORT CODE;
  - SERVER-SIDE PRE-RENDERING CODE;
- SEO / INDEXING SUPPORT CODE;
- APP-STORE RELATED INFORMATION:
  - NAME;
  - DESCRIPTION;
  - COMMERCIAL INFORMATION;
  - VERSION INFORMATION;

FIG. 2B

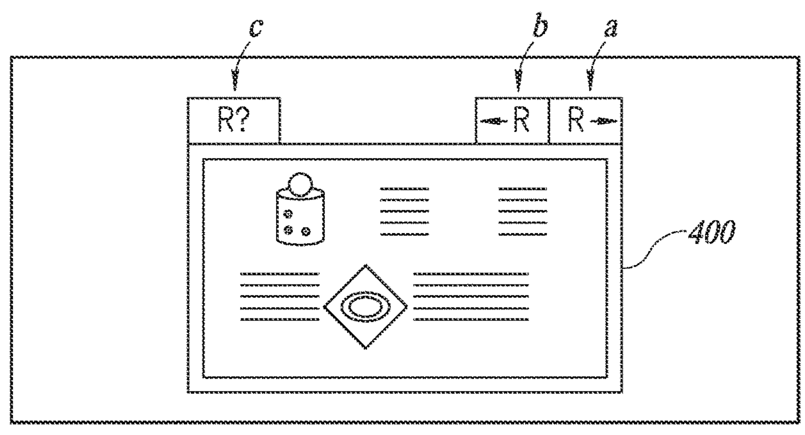
FIG. 6
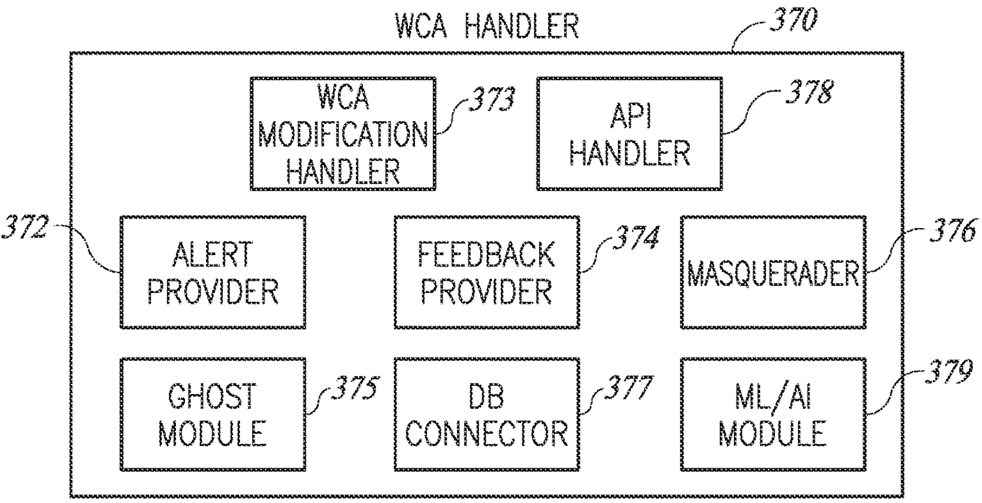
FIG. 7A
ML/AI MODULE
379
3791
DECISION ENGINE
3792
CMS EXTRACTOR/ TRAINER
3793
ELEMENT BEHAVIOR TRACKER/TRAINER
3794
ELEMENT BEHAVIOR ML/AI MODULE
3795
MERGING ML/AI MODULE
FIG. 7B

SYSTEM AND METHOD FOR CREATION AND HANDLING OF CONFIGURABLE APPLICATIONS FOR WEBSITE BUILDING SYSTEMS

CROSS REFERENCE TO RELATED APPLICATIONS

This application is a continuation application of U.S. patent application Ser. No. 16/683,338, filed Nov. 14, 2019 which claims priority from U.S. provisional patent applications 62/760,965 filed Nov. 14, 2018 and 62/927,703, filed 30 Oct. 2019 all of which are incorporated herein by reference.

FIELD OF THE INVENTION

The present invention relates to website building systems generally and to configurable applications in particular.

BACKGROUND OF THE INVENTION

Visual editing systems, typically used in website building systems, are used by both novices and professionals to create interactive websites. Existing website building systems are based on a visual editing model and most website building systems typically provide multiple templates, with a template possibly including a complete sample website, a website section, a single page or a section of a page.

Website building system users (also known as designers, subscribers, subscribing users or site editors) may design the website and the website's end-users (the "users of users") may access the websites created by the users. Although end-users typically access the system in read-only mode, website building systems (and websites) may allow end-users to perform changes to the web site such as adding or editing data records, adding talkbacks to news articles, adding blog entries to blogs etc. The website building system may in fact allow multiple levels of users (i.e. more than two levels), and assign different permissions and capabilities to each level. Users of the website building system (in particular in the full or partial on-line configurations described below) may register in the website building system server which manages the users, their web sites and accesses by the end-users.

A website building system may be a standalone system, or may be embedded inside a larger editing system. It may also be on-line (i.e. applications are edited and stored on a server), off-line or partially on-line (with web sites being edited locally but uploaded to a central server for publishing). The website building system may use an internal data architecture to store website building system based sites and this architecture may organize the handled sites' internal data and elements inside the system. This architecture may be different from the external view of the site (as seen, for example, by the end-users). It is also typically different from the way the HTML pages sent to the browser are organized.

For example, the internal data architecture may contain additional properties for each element in the page (creator, creation time, access permissions, link to templates, SEO (search engine optimization) related information etc.) which are relevant for the editing and maintenance of the site in the website building system, but are not externally visible to end-users (or even to some editing users). The website building system may implement some of its functionality (including both editing and run-time functionality) on a server or server set, and some of its functionality on client elements. The website building system may also determine dynamically whether to perform some functionality on the server or on the client platform.

A website building system typically handles the creation and editing of visually designed applications (such as a website) consisting of pages, containers and components. Pages may be separately displayed and contain components. Components may include containers as well as atomic components.

The website building system may support hierarchical arrangements of components using atomic components (text, image, shape, video etc.) as well as various types of container components which contain other components (e.g. regular containers, single-page containers, multi-page containers, gallery containers etc.). The sub-pages contained inside a container component are referred to as mini-pages, and each of which may contain multiple components. Some container components may display just one of the mini-pages at a time, while others may display multiple mini-pages simultaneously.

The components may be content-less, or have internal content. An example of the first category is a star-shape component, which does not have any internal content (though it has color, size, position and some other parameters). An example of the second category is a text paragraph component, whose internal content includes the internal text as well as font, formatting and layout information. This content may, of course, vary from one instance of the text paragraph component to another. Components which have content are often referred to as fields (e.g. a "text field").

Pages may use templates, general page templates or component templates. Specific cases for templates include the use of an application master page containing components replicated in all other regular pages, and the use of an application header or footer (which repeat on all pages). Templates may be used for the complete page or for page sections. The website building system may provide inheritance between templates, pages or components, possibly including multi-level inheritance, multiple inheritance and diamond inheritance (i.e. A inherits from B and C and both B and C inherit from D).

The visual arrangement of components inside a page is called a layout. The website building system may also support dynamic layout processing, a process whereby the editing of a given component (or other changes affecting it such as externally-driven content change) may affect other components, as further described in U.S. Pat. No. 10,185,703 entitled "Website Design System Integrating Dynamic Layout and Dynamic Content" granted 22 Jan. 2019 and assigned to the common assignee of the present invention and incorporated herein by reference.

A website building system may be extended using a third party application and its components as well list applications (such as discussed in US Patent Publication No. US 2014/0282218 entitled "Website Building System Integrating Data Lists with Dynamic Customization and Adaptation" published 18 Sep. 2014 and assigned to the common assignee of the present invention and incorporated herein by reference). These third party applications and list applications may be added and integrated into designed websites.

Such third party applications and list applications may be purchased (or otherwise acquired) through a number of distribution mechanisms, such as being pre-included in the website building system design environment, from an Application Store (integrated into the website building system or external to it) or directly from the third party application vendor.

The third party application may be hosted on the website building system vendor's own servers, the third party application vendor's server or on a 4th party server infrastructure.

The website building system may also allow procedural code to be added to some or all of the system's entities. Such code could be written in a standard language (such as JavaScript), an extended version of a standard language or a language proprietary to the specific website building system. The executed code may reference Application Programming Interfaces (API's) provided by the website building system itself or external providers. The code may also reference internal constructs and objects of the website building system, such as pages, components and their attributes.

The procedural code elements may be activated via event triggers which may be associated with user activities (such as mouse move or click, page transition etc.), activities associated with other users (such as an underlying database or a specific database record being changed by another user), system events or other types of conditions.

The activated code may be executed inside the website building system's client element, on the server platform or by using a combination of the two or a dynamically determined execution platform. Such a system is described in US Patent Publication No. US 2018/0293323 entitled "System and Method for Smart Interaction Between Website Components" published 11 Oct. 2018, now granted as U.S. Pat. No. 11,449,573 on 20 Sep. 2022, and assigned to the common assignee of the present invention and incorporated herein by reference.

Typical site creation may be based on a number of models, including a visual editing model (in which the user edits a previously created site) and an automatic site generation model or a combination thereof as illustrated in FIG. 1 to which reference is now made and is described in U.S. Pat. No. 10,073,923 entitled "System and Method for the Creation and Update of Hierarchical Websites Based on Collected Business Knowledge" granted 11 Sep. 2018 and assigned to the common assignee of the present invention and incorporated herein by reference.

It will be appreciated that throughout the specification, the acronym WBS may be used to represent a website building system. FIG. 1 illustrates a system 100 that comprises a typical website building system 5 in communication with client systems operated by WBS vendor staff 61, a site designer 62 (i.e. a user), a site viewer 63 (i.e. user of user) and with external systems 70. Website building system 5 may further comprise a WBS (website building system) site manager 10, an object marketplace 15, a WBS RT (runtime) server 20, a WBS (website building system) editor 30, a site generation system 40 and a WBS content management system (CMS) 50. It will be appreciated that the elements of FIG. 1 may function as described in U.S. Pat. No. 10,073,923.

In the visual editing model, the user (designer) edits a site based on one or more website templates. The website building system provider may provide multiple site (or other) templates, with each template possibly including a complete sample web site, a web site section, a single page or a section of a page. Users may have the option to start with an empty site (essentially a "blank page" template) but would typically start with an actual site template.

The WBS provider may provide site templates ranging from the very generic (e.g. mobile site, e-store) through the more specific (e.g. law office, restaurant, florist) to the highly specific ones (e.g. a commercial real-estate law office or a Spanish tapas restaurant). Such templates are typically stored in a repository accessible to users of the website building system and are typically classified according to business type, sub-type or industry. Templates may also be created (and classified) according to style, color range or other parameters and not just according to business type. Site templates may be extended with additional (typically back-end) functionality, services and code in order to become full-fledged vertical solutions integrated with the website building system.

Thus, the user's first experience when creating a site using a website building system visual editor may typically be that the user chooses a template (e.g. according to style or industry type/sub-type), possibly a blank template and then edits the template in the visual editor including the editing of content, logic, layout and attributes. Such editing may include (in particular) adapting the template and its elements to the details of the user's business. The user may then publish the modified site.

Under the site generation model, the website building system generates an initial site for the user, based on a selected template, possibly modified by filling-in common elements of information, and possibly allowing follow-up editing of the generated site. This filling-in is required as various pieces of information (such as the business name or a description of the management team) are included in multiple locations in the template's pages. Thus, the user may have to change the business name (for example) in multiple places throughout the template.

Furthermore, some template elements (e.g. a generic product page) may appear multiple times, with each instance displaying the details of a different instance of an underlying entity (e.g. different products offered in the site). Such multiple instances may be manually specified (e.g. the details of different persons in the company's management team) or dynamically derived from an external database (e.g. product details from the "products on sale" database). Such an arrangement is often known as a "repeater".

The template may also include fields. For example, the website building system may allow the template designer to specify fields (also known as "placeholders") for the insertion of values inside the templates, such as {CompanyName}, {ProductName}, {ProductPrice} etc. The user may also specify the values for the fields defined in the template selected for the website.

The website building system may allow the user to enter simple or complex values (e.g. text and images), as well as additional (non-field) information such as selection of included pages or web site areas, colors, style information, links, formatting options, website display options, decoration elements (such as borders and backgrounds) etc.

The website building system may also allow the user to enter some of this additional information before selecting a template, and use this information to help in selecting a template (e.g. by narrowing the set of proposed templates). For example, the user may select a certain generic color scheme (e.g. pastel colors) or style (e.g. business/formal), and the system may then use this selection to narrow the set of proposed templates.

The system may also display a series of views or questionnaires to allow the user to enter values or selections (for both the defined fields and the additional information above). The system may further create a connection (or binding) between a multiple-instance element of the template (as described herein above) and an internal or external database which provides the data instances used to generate the displayed instances.

Once a template has been selected and its fields and additional information have been specified (e.g. through the questionnaires or through binding to data sources), the website building system may generate the website containing the combined information. The user may then publish the site (through the website building system or otherwise).

A website building system may perform semi-automatic site creation using a different model as described in U.S. Pat. No. 10,073,923. Under this model, the system gathers information on the user and his web site requirements from multiple sources which may include, for example: user-filled questionnaires; existing user presence (such as existing web sites or social media presence), industry sources (such as general trade web sites), off-line information and internal system repositories which provide information on specific business types, such as basic template information for specific business types (lawyers, restaurants, plumbers, graphic designers etc.), possibly refined for specific industries (e.g. distinguishing between real-estate lawyers and personal injury lawyers).

The system may also gather external information from other sites, both internal and external to the system. Such information may affect, for example, the selection of offered questionnaires and layout elements, proposed defaults etc. Such information may also typically be collected on a statistical or summary basis, in order not to expose information belonging to any single user, and protect users' privacy, anonymity and legal rights (such as copyrights). Such information may be located based on information provided by the user which may be direct (e.g. an existing website address) or indirect (a business name and geographical address which can be used to locate information about the business).

The gathered information is analyzed and arranged into a repository of content elements which are then mapped onto layout elements which present the content from the content elements and combine the layout elements to form the site. The layout element mapping, selection and combination process may be fully automatic or semi-automatic (i.e. including user interaction).

To support the above mentioned functionality above, a website building system will typically maintain a series of repositories, stored over one or more servers or server farms. Such repositories may typically include various related repositories such as a user information/profile repository, a WBS (website building system) component repository, a WBS site repository, a Business Intelligence (BI) repository, an editing history repository, a third party application store repository, etc. The system may also include site/content creation related repositories such as a questionnaire type repository, a content element type repository, a layout element type repository, a design kit repository, a filled questionnaires repository, a content element repository, a layout element repository, a rules repository, a family/industry repository etc. A description of these repositories may be found in U.S. Pat. No. 10,073,923.

SUMMARY OF THE PRESENT INVENTION

There is provided, in accordance with a preferred embodiment of the present invention, a website building system. The system includes at least one database storing website components, together with definitions and instances of website building system configurable applications (WCAs), where the WCAs are single packaged entities which can also be accessed as a sets of customizable elements; a WCA app builder to enable a developer to build and edit a first version WCA; an in-site editor to provide specific editing capabilities for a user to edit at least one of a definition or an instance of the first version WCA; a WCA handler to receive at least one modification to the first version WCA from the user and at least one update to the first version WCA from the developer, the WCA handler to merge at least between the at least one modification and the at least one update to create a changed WCA, the WCA handler to also resolve conflicts or loss of functionality and to handle permissions between the least one modification and the at least one update and a WCA site viewer to support viewing of the first version WCA and the changed WCA during runtime of the website building system.

Moreover, in accordance with a preferred embodiment of the present invention, the at least one database also stores website parameters for websites built by the website building system and user collected information for a user of the website building system, where the user collected information is at least one of: geographical location, language, editing history and collected business intelligence.

Further, in accordance with a preferred embodiment of the present invention, the WCA handler includes at least one of: a ghost module to ensure operation of the changed WCA as a result of a removed element from the first version WCA by at least one of: the at least one modification, the at least one update and a combination thereof; and a masquerader to safeguard compatibility between a replaced element and the replacing element of the changed WCA as a result of at least one of: the at least one modification, the at least one update and a combination thereof to ensure operation of the changed WCA.

Still further, in accordance with a preferred embodiment of the present invention, the ghost module performs at least one of: fetching the original definition, structure, and attributes of the removed component, providing some or all of the behavior of the removed component based on the user collected information and simulating an API for the removed component.

Additionally, in accordance with a preferred embodiment of the present invention, the masquerader provides a translation facility for interaction between elements of the changed WCA and the replacing element using specific translation drivers based on the website parameters and the user collected information.

Moreover, in accordance with a preferred embodiment of the present invention, the system also includes a WCA manager to provide management services for the first version WCA and the changed WCA within the website building system; a WCA CMS coordinator to access at least the website components and the user collected information from the least one database; and for the WCA handler to coordinate activity between the WCA app builder, the WCA manager, the WCA site viewer, the WCA in-site editor and the WCA CMS coordinator.

Further, in accordance with a preferred embodiment of the present invention, the system includes at least one of: a WCA app store manager to enable the purchase of a WCA for use in the website building system and a WCA site generation system (SGS) to generate sites containing the first version WCA and the changed WCA.

Still further, in accordance with a preferred embodiment of the present invention, the WCA app builder includes a customization panel creator to configure and generate associated specific customization panels for a WCA; a dialog editor to enable the creation and editing of definitions for customizable elements for a WCA and a WCA analyzer to perform at least one of: recognize repeating or hierarchical elements in the structure of a WCA; perform static source analysis on a WCA for the customization panel creator; perform static source analysis to determine runtime permissions for a WCA and to generate template code.

Still further, in accordance with a preferred embodiment of the present invention, the system includes at least one of: a WCA modification handler to receive and resolve conflicts between the at least one modification and the at least one update for the first version WCA; a machine learner (ML)/artificial intelligence (AI) module to employ machine learning and artificial intelligence techniques to provide support for the resolution of the conflicts and the loss of functionality for the ghost module and the masquerader and to provide merging support for the WCA modification handler; an Application Programming Interface (API) handler to replace at least the first version WCA with at least one other WCA having an identical or similar API; an alert provider to provide alerts regarding implementation and use of the WCA handler; a feedback provider to gather information and provide analysis on general WCA instance changes and a database connector to check for field types and previous connections made by the user or other users of the at least one WCA.

Additionally, in accordance with a preferred embodiment of the present invention, the WCA modification handler includes an update receiver to receive the at least one modification and the at least one update to the first version WCA; an API analyzer to analyze the pre-packaged API of an existing WCA to detect the API properties and interfaces and to generate a matching settings panel for a changed version of the WCA; a WCA merger to merge the at least one modification and the at least one update to create the changed WCA from the first version WCA; a change resolver to resolve conflicts between the at least one modification and the at least one update; a permission determiner to determine and apply any permission restrictions for the at least one modification and the at least one update and to determine any permissions required at runtime for the changed WCA and a change applier to apply the at least one modification and the at least one update to the first version WCA according to the WCA merger, the change resolver and the permission determiner to create the changed WCA.

Moreover, in accordance with a preferred embodiment of the present invention, the system includes a variant creator to create a new variant WCA based on an existing WCA.

Further, in accordance with a preferred embodiment of the present invention, the WCA merger includes a difference analyzer to gather and analyze the change set between the at least one modification and the at least one update and a conflict resolver to resolve conflicts between the at least one modification and the at least one update.

Still further, in accordance with a preferred embodiment of the present invention, the ML/AI module includes a CMS extractor/trainer to extract and train data from the at least one database; an element behavior tracker/trainer to track the behavior of WCAs and their elements; an element behavior AL/AI module to learn about the behavior of the WCAs from the element behavior tracker/trainer and the CMS extractor/trainer; a merging ML/AI module to learn about merging behaviors of the WCAs from the element behavior tracker/trainer and the CMS extractor/trainer and a decision engine to make decisions for the ghost module, the masquerader and the WCA modification handler based on the element behavior AL/AI module and the merging ML/AI module.

Additionally, in accordance with a preferred embodiment of the present invention, the WCA merger merges according to at least one of: developer or user hints, semantic tags and the output of the decision engine.

There is provided, in accordance with a preferred embodiment of the present invention, a method for a website building system. The method includes storing in at least one database, website components, together with definitions and instances of website building system configurable applications (WCAs), where the WCAs are single packaged entities which can also be accessed as a sets of customizable elements; enabling a developer to build and edit a first version WCA; providing specific editing capabilities for a user to edit at least one of a definition or an instance of the first version WCA; receiving at least one modification to the first version WCA from the user and at least one update to the first version WCA from the developer; merging at least between the at least one modification and the at least one update; resolving conflicts or loss of functionality and handling permissions between the least one modification and the at least one update; creating a changed WCA from the merging, the resolving conflicts and the handling permissions; and supporting viewing of the first version WCA and the changed WCA during runtime of said website building system.

Moreover, in accordance with a preferred embodiment of the present invention, the storing also stores website parameters for websites built by the website building system and user collected information for a user of the website building system, where the user collected information is at least one of: geographical location, language, editing history and collected business intelligence.

Further, in accordance with a preferred embodiment of the present invention, the receiving, merging, resolving conflicts and handling permissions include at least one of: ensuring operation of the changed WCA as a result of a removed element from the first version WCA by at least one of: the at least one modification, the at least one update and a combination thereof; and safeguarding compatibility between a replaced element and the replacing element of the changed WCA as a result of at least one of: the at least one modification, the at least one update and a combination thereof to ensure operation of the changed WCA.

Still further, in accordance with a preferred embodiment of the present invention, the ensuring operation of the changed WCA as a result of a removed element includes performing at least one of: fetching the original definition, structure, and attributes of the removed component, providing some or all of the behavior of the removed component based on the user collected information and simulating an API for the removed component.

Additionally, in accordance with a preferred embodiment of the present invention, the safeguarding compatibility includes providing a translation facility for interaction between elements of the changed WCA and the replacing element using specific translation drivers based on the website parameters and the user collected information.

Moreover, in accordance with a preferred embodiment of the present invention, the method also includes providing management services for the first version WCA and the changed WCA within the website building system; accessing at least the website components and the user collected information from the at least one database and coordinating activity between the enabling a developer, the receiving, merging, resolving conflicts and handling permissions, the providing management services, the providing specific editing capabilities, the supporting viewing and the accessing.

Further, in accordance with a preferred embodiment of the present invention, the method includes at least one of:

enabling the purchase of a WCA for use in the website building system; and generating sites containing the first version WCA and the changed WCA.

Still further, in accordance with a preferred embodiment of the present invention, the enabling a developer to build and edit a first version WCA includes configuring and generating associated specific customization panels for a WCA; enabling the creation and editing of definitions for customizable elements for a WCA; and performing at least one of: recognizing repeating or hierarchical elements in the structure of a WCA; performing static source analysis on a WCA for the configuring and generating associated specific customization panels; performing static source analysis to determine runtime permissions for a WCA and generating template code;

Additionally, in accordance with a preferred embodiment of the present invention, the method includes at least one of: receiving and resolving conflicts between the at least one modification and the at least one update for the first version WCA; employing machine learning and artificial intelligence techniques to provide support for the resolution of the conflicts and the loss of functionality for the ensuring operation of the changed WCA as a result of a removed element and the safeguarding compatibility and to provide merging support for the receiving and resolving conflicts; replacing at least the first version WCA with at least one other WCA having an identical or similar API; providing alerts regarding implementation of the receiving, merging, resolving conflicts and handling permissions; gathering information and providing analysis on general WCA instance changes; and checking for field types and previous connections made by the user or other users of the at least one WCA.

Moreover, in accordance with a preferred embodiment of the present invention, the receiving and resolving conflicts includes receiving the at least one modification and the at least one update to the first version WCA; analyzing the pre-packaged API of an existing WCA, detecting the API properties and interfaces and generating a matching settings panel for a changed version of the WCA; merging the at least one modification and the at least one update to create the changed WCA from the first version WCA; resolving conflicts between the at least one modification and the at least one update; determining and applying any permission restrictions for the at least one modification and the at least one update and determining any permissions required at runtime for the changed WCA and applying the at least one modification and the at least one update to the first version WCA according to the merging, the resolving conflicts, the determining and applying any permission restrictions and creating the changed WCA.

Further, in accordance with a preferred embodiment of the present invention, the method includes creating a new variant WCA based on an existing WCA.

Still further, in accordance with a preferred embodiment of the present invention, the merging includes gathering and analyzing the change set between the at least one modification and the at least one update and resolving conflicts between the at least one modification and the at least one update.

Additionally, in accordance with a preferred embodiment of the present invention, the employing machine learning and artificial intelligence techniques includes extracting and training data from the at least one database; tracking the behavior of WCAs and their elements; learning about the behavior of WCAs from the tracking the behavior and the extracting and training data; learning about merging behaviors of WCAs from the tracking the behavior of WCA and the extracting and training data and making decisions for the ensuring operation of the changed WCA, the safeguarding compatibility and the receiving and resolving conflicts based on the learning about the behaviors and the learning about merging behaviors.

Further, in accordance with a preferred embodiment of the present invention, the WCA includes at least one of: front end elements, back end elements, support elements and content elements.

Still further, in accordance with a preferred embodiment of the present invention, the support elements include at least one of: an API definition, a dashboard, UI support panels, rendering support, SEO support and app store support, specific manipulation handles, an editing behavior plug-in and frame elements.

Additionally, in accordance with a preferred embodiment of the present invention, the WCA is one of: a single WBS component, a set of components forming a layout, a set of components forming a new composite component, a page section, a page, a website, a vertical application, a dashboard component, a dashboard page and panels.

Moreover, in accordance with a preferred embodiment of the present invention, the customizable elements are at least one of: a hierarchical set of contained components; a component running in the backend; associated code; an API definition; data bindings; and a configuration dialog.

Further, in accordance with a preferred embodiment of the present invention, the associated code is encapsulated to provide functionality for an associated customizable element.

Still further, in accordance with a preferred embodiment of the present invention, the at least one update is according to user change acceptance rules regarding WCA components and their attributes.

Additionally, in accordance with a preferred embodiment of the present invention, that at least one update is by at least one of: inheritance, by reference and by delivery.

Moreover, in accordance with a preferred embodiment of the present invention, the delivery is at least one of: internal delivery from within the website building system, external electronic delivery from outside the website building system and external physical delivery from outside the website building system.

Further, in accordance with a preferred embodiment of the present invention, the at least one of: said conflicts is at least one of: a full break and a partial break in the connection between at least two components of the first version WCA and where the connection is at least one of: a direct connection, a message-based connection and a code-based connection.

Still further, in accordance with a preferred embodiment of the present invention, at least one of the permissions is the developer defined per each of the customizable elements.

Additionally, in accordance with a preferred embodiment of the present invention, at least one of the permissions is the level of access as defined by the developer for the user.

Moreover, in accordance with a preferred embodiment of the present invention, the level of access is at least one of: the visibility of elements, the ability to edit elements, the ability to delete elements and the ability to extend.

Further, in accordance with a preferred embodiment of the present invention, the at least one update is a variant creation of the first version WCA.

Still further, in accordance with a preferred embodiment of the present invention, the at least one: of the conflicts is at least one of: functionality and attribute incompatibility of the customizable components.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 2A and 2B are a listing of the possible sub elements of a website building system configurable application (WCA), constructed and operative in accordance with the present invention;

FIG. 6 is a schematic illustration of special frame elements of a UI associated with a recipe WCA; constructed and operative in accordance with the present invention;

FIG. 7A is a schematic illustration of the elements of the WCA handler of FIG. 4, constructed and operative in accordance with the present invention;

FIG. 7B is a schematic illustration of the elements of the ML/AI module of FIG. 7, constructed and operative in accordance with the present invention;

Figure 1:
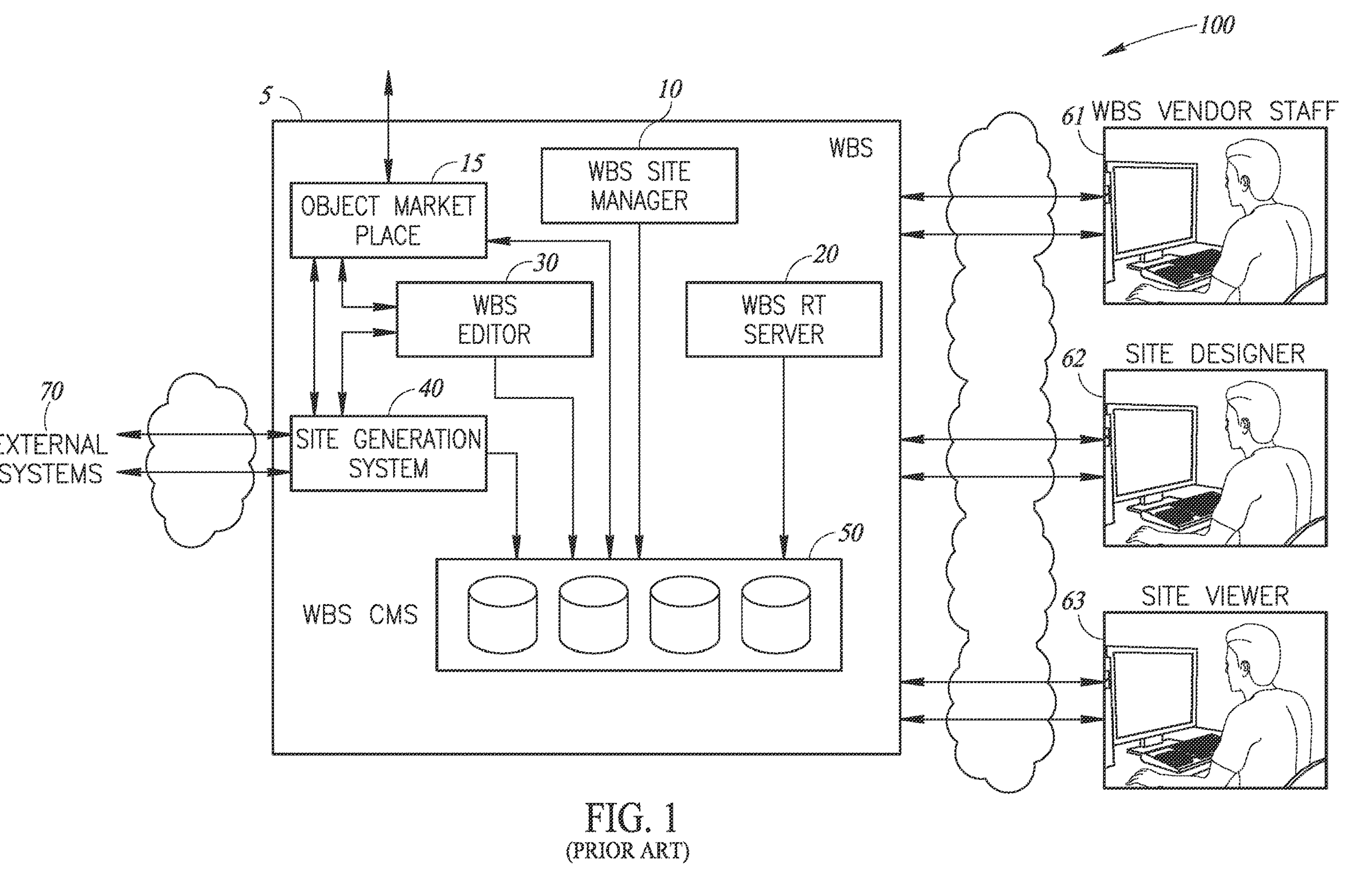
FIG. 1 is a schematic illustration of a typical representation of a website building system of the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Widgets (also known as web widgets) are known in the art as mini applications that may be used to provide information to visitors on a website or to gather information for other purposes. They are typically standalone applications that can be embedded into third party sites by any user on a page where they have rights of authorship. The term widget may encompass terms such as search widgets, trackers, new headlines, feeds and other such live apps. They also provide user interfaces that allow a website designer or website end user to interact with them.

An example widget is that of a travel widget which may allow for the selection of a particular city and have sub functionalities that provide for the pertinent city the weather, a list of upcoming events and attractions and a map of the city. The subfunctions may related so that clicking on a particular event may open up the map showing the location of event in question. Furthermore, the map may be downloadable and the user may be able to adjust its layout to better fit its target platform.

Applicants have realized that if the owner of the particular widget, updates or changes its sub-elements (e.g. deletes the maps sub-element or modifies the event display sub-element), the code connection between the event sub-element and the map sub-element may become "broken" causing a loss of functionality and a designer may have to "fix" the code in order for the two to become reconnected or for the widget to function without one of these sub-elements. Widgets typically have inheritance and therefore a change to the code which affects the functioning of some part or sub element, will affect other parts/sub elements.

Applicant has also realized that in this scenario, the designer of the website using the widget may not be a computer programmer and may not have the knowledge nor the skills required to fix the required code.

Applicant has further realized that the limitations of the widgets of the prior art may be overcome using a WCA (website building system configurable application) which may be such widgets as discussed herein above as well as other types of applications or other WBS entities such as vertical solutions, applications and plug-ins. A WCA is a set of elements packaged together which may be used in a website or a mobile application. The elements may include website building system components, associated code and additional elements as further described below and shown in FIGS. 2A and 2B to which reference is now made. The WCAs may be customized to manipulate some or all of their elements to provide a component-based operation. The WCA may be embedded as an instance into a website page in a similar manner to a widget or a third party application.

Thus, for the scenario of the travel widget as described herein above, if a designer embeds a travel WCA (as opposed to the prior art travel widget as described herein above) and them removes the map element (for example), the code which updates the map element when an event is selected will be updated or changed accordingly. As discussed herein above, the designer may not have the skills to fix the code by himself.

It will be appreciated that such WCAs may simultaneously function as an embedded application (similar to a third-party application), as website building system components or as entities whose elements/sub elements may be separately manipulated by the website designer. The WCAs may be edited by both the WCA developer and the web site designer (at a level determined by the developer) to allow for updates, variant creation etc. The WCA developer may be part of the WBS vendor 61 development team or may be an independent entity who sells via an Appstore or through any other channel or may even be part of the site designer organization. As discussed herein above any modifications made to the WCA may not necessarily affect its functioning.

It will be appreciated that developers may update WCAs that they themselves have developed and that site designers 62 or users of the WCA may also modify the WCA further in order to customize it for themselves creating more than one version of the WCA. Updates may also occur automatically as a result of inheritance or change of reference. An update may also be delivered via an internal delivery from within the website building system, an external electronic delivery from outside the website building system such as via web services, e-mail, FTP, P2P etc. or an external physical delivery such as media delivery.

It will also be appreciated that typically updates to a WCA may come from a WCA developer and modifications from a WCA user such as site designer 62. These changes may also be interchangeable since (for example) site designer 62 may create a variant version of an existing WCA and he may customize WCAs per each instance on a site. When this occurs, site designer 62 may become a developer of the WCA since he now has a changed version of the original WCA which he can publish for his users.

This customization may be done by using the pre-packaged API directly or through auto generated panels, through methods pre-defined by a WCA vendor (such as custom built panels), by adding or removing some of the elements, by changing any of the elements through their regular editor menus and panels and by writing code which works with the WCA as a whole and utilizes its API. Another customization may include writing code which works with the elements of the WCA adding functionality over its original intention. For example, a button which is used as a "play video" button for a WCA is may be modified by site designer 62 by adding code which counts clicks to the button and updates an incremental counter. Customization may also be applied to other elements of the WCA, such as back-end elements or the WCA configuration and setting panels themselves. These forms of customization are described in more detail herein below.

It will be also appreciated that the techniques described herein below are not just applicable to changes that break code. There may also be other change types which may "break" or affect the functioning of the WCA. For example, the WBS may support components that update each other without code such that a change in the value (for example) displayed by a component A is reflected some way in component B which may display (for example) a total of the values displayed in component A. Such a link may be a feature of the WBS which does not involve any code. The link may be broken if either component (A or B) is deleted or replaced with another component or component type.

Such a breakdown may be due to site designer 62 breaking something in the WCA during his site creation or due to an update from the original developer of the WCA which is not consistent with the changes made by site designer 62. For example, site designer 62 using WCA X creates a connection between components A and B (in WCA X) which did not previously exist. In a later update B is removed from WCA X which is only a problem for site designer 62 who created the A-B link and not for other site designers 62 using the same WCA. It will be appreciated that such code or connection/link breaks may be full or partial.

Thus for a WCA acting as the travel widget described herein above, a change that breaks the code connection or an update of an event or the map WCA sub-elements may not affect the functionality of the WCA which may be able to ghost, masquerade some of the lost functionality of the modified or updated sub-elements or update any pre-defined installation policies for the change as described in more detail herein below. It will be appreciated that connections between WCA sub-elements may be direct or message based as well as code based.

Applicant has further realized that this ability to "fix" breaks i.e. compensate for modifications after they have occurred allowing to WCA to retain full functionality may improve that functionality of the embedding website and of the computer itself running the website. When a "broken" widget does not function properly, the website running it does not function properly either and is likely to crash. Furthermore, the ability to embed WCAs in WBS websites (which are based on a complex set of inherited elements, including layout, content and code) improves system storage use (as WCA definitions are included by reference instead of being duplicated) and performance (as WCAs can be loaded only when required, and parts of them are loaded to the server only). The ability to resolve breaks and conflicts greatly facilitates the use of such inherited/by-reference WCAs in conjunction with site-specific modifications and customizations.

Figure 3:
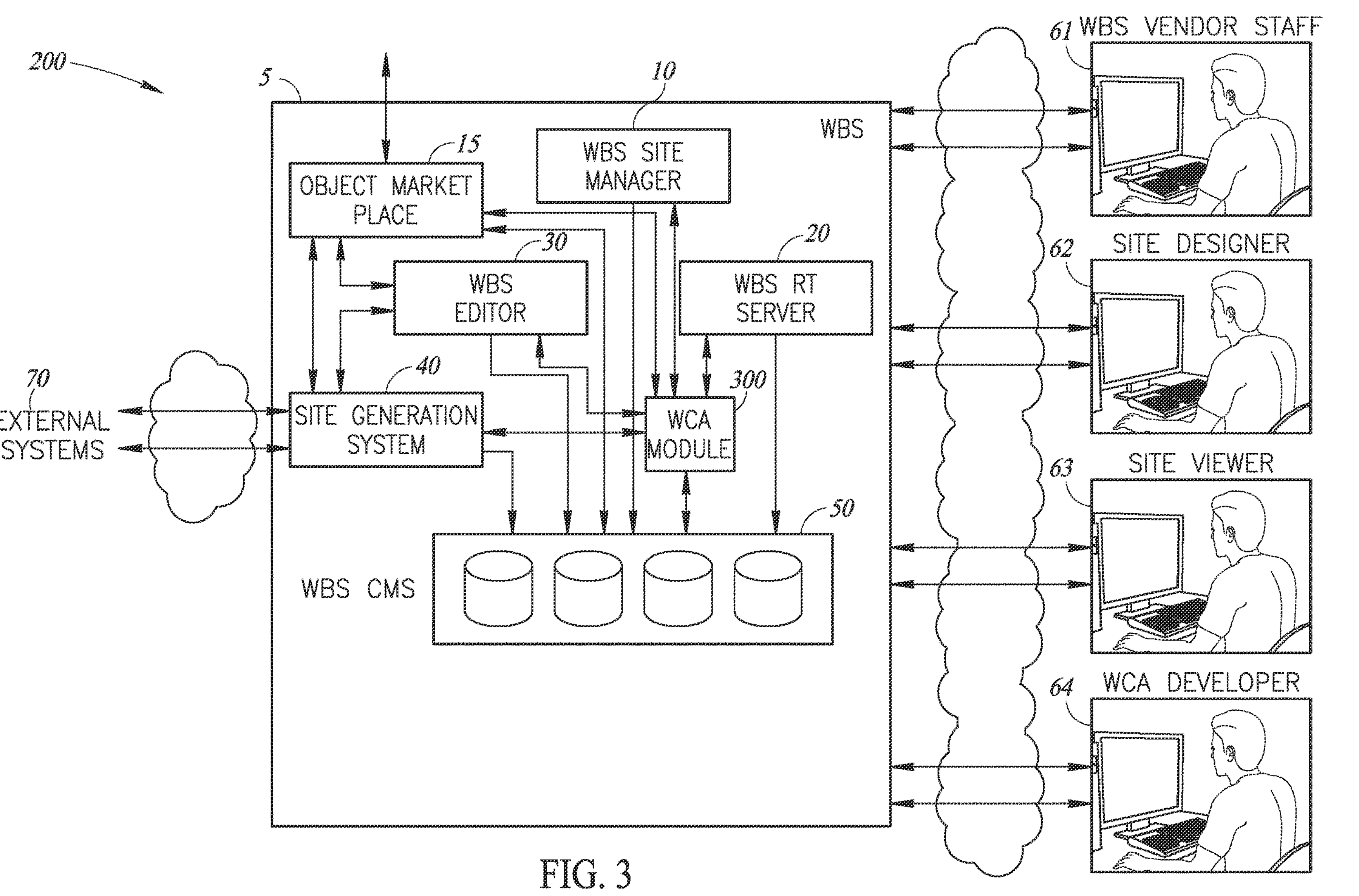
FIG. 3 is a schematic illustration of a system for handling website building system (WBS) configurable applications (WCA's) in a website building system, constructed and operative in accordance with the present invention.

Reference is now made to FIG. 3 which illustrates a system 200 for handling website building system (WBS) configurable applications in a website building system according to an embodiment of the present invention. System 200 may comprise the elements of system 100 as described in U.S. Pat. No. 10,073,923 (as well as any sub elements) in conjunction with WCA module 300. System 200 may allow for the creation and integration of WCAs into the website building system and their manipulation as described in more detail herein below.

It will be appreciated that from herein, the discussion on system 200 refers to the applications created by designers using a website building system and accessed by the end-users as web sites, although system 200 may be applied to other categories of on-line applications which are accessed using specific client software (proprietary or not). Such client software may run standalone or be activated from a browser (such as the Adobe Flash plug-in). End-users may access these web sites using client software on regular personal computers and also on smart-phones, tablet computers and other desktop, mobile or wearable devices. Alternatively, system 200 may be applicable to systems which generate mobile applications, native applications or other application types as described in U.S. Pat. No. 9,996,566 entitled "Visual Design System for Generating a Visual Data Structure Associated with a Semantic Composition Based on a Hierarchy of Components" granted 12 Jun. 2018 and assigned to the common assignee of the present invention and incorporated herein by reference.

It will be appreciated that all the elements of system 200 may in general handle website building system objects or components.

Figure 4:
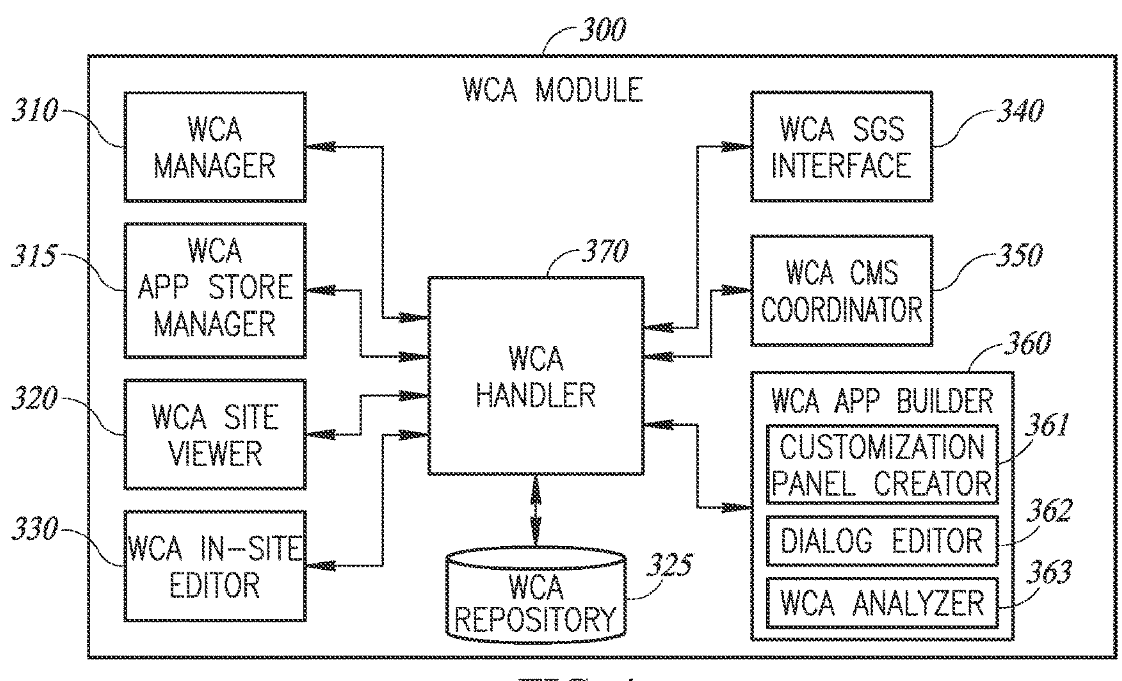
FIG. 4 is a schematic illustration of the elements of the WCA module of FIG. 3, constructed and operative in accordance with the present invention.

WCA module 300 may interface with multiple parts of website building system 5 as well as directly with users of various types. Reference is now made to FIG. 4 which illustrates the elements of WCA module 300. WCA module 300 may comprise a WCA manager 310, a WCA Appstore manager 315, a WCA site viewer 320, a WCA repository 325, a WCA deployment/usage environment (in-site editor) 330, a WCA SGS (site generation system) interface 340, a WCA CMS coordinator 350, a WCA building environment (app builder) 360 and a WCA handler 370. WCA app builder 360 may further comprise a customization panel creator 361, a dialog editor 362 and a WCA analyzer 363.

WCA manager 310 may integrate with WBS site manager 10 to provide management services for the WCA (at the WBS vendor 61, site designer 62 and WCA developer 64 level). WCA Appstore manager 315 may integrate with object marketplace 15 to provide the ability to offer WCAs for sale and to purchase offered WCAs. WCA site viewer 320 may integrate with the WBS RT server 20 to deploy and execute applications which include WCAs for end users (site visitors/viewers 63) which use sites embedding WCAs. In-site editor 330 may integrate with the regular WBS editor 30 for specific editing capabilities related to WCAs for WCA users (site owners/designers 62) which embed WCAs into their sites a WCA SGS interface 340 may interface with site generation system 40 to provide for the creation of sites containing WCAs. WCA CMS coordinator 350 may interface with WBS CMS 50 to provide access to the required repositories. App builder 360 may be used by WCA developers 64 to build and edit WCAs and WCA handler 370 may coordinate the functionality of the elements within WCA module 300 accordingly.

System 200 may store the WCA definitions in the specific WCA repository 325 or may store them elsewhere such as in WBS CMS 50 using a reference to it in the containing page or application. Such a central storage may simplify further updating and version control of the WCAs. WCA CMS coordinator 350 may also resolve the references and bring the relevant WCA copy from a local application copy, the repositories above or any other storage. System 200 may also store the WCA definition (including all of its elements) in WBS components repository 516 and the actual WCA instances in the WBS site repository 509 (as discussed in U.S. Pat. No. 10,073,923). Alternatively, system 200 may store them in WCA repository 325.

It will be appreciated that all the elements of a WCA may have front-end, back-end and additional sub-elements as described in more detail herein below. Furthermore, the parts of the WBS handling some or all of the sub-elements may be implemented as website building system applications (which may include WCAs by themselves) on top of the website building system. Alternatively, some may be implemented as extensions or applications running on the website building system.

As discussed herein above, relevant user categories may include WCA users (site designers) 62, end users (site visitors/viewers) 63 and WCA developers 64 (part of the website building system vendor staff or external developers).

It will be appreciated that there may be some overlap between the user categories, or users of one category could also function in some cases as users of another category (under the same or different set of user ID or credentials). For example, a WCA developer 64 may also develop web sites using his own WCAs. The website building system may also allow end-users/viewers 63 to make some edits to the site they are visiting, possibly using or modifying a WCA instance in the site.

It will also be appreciated that the site designer 62 may also be the site owner, or may be a separate user given editing permissions for the site by the site owner (without owning the site), such as an employee of the site owner or an external design agency. WCAs may be created by a WCA developer 64 who may be a member of the WBS vendor staff 61 or a third party WCA provider. System 200 may also support creation of WCAs by the designer community, and a marketplace for such WCAs as well as creation of a WCA based on an existing WCA (as discussed in more detail herein below). For the purpose of discussion, reference to the term user may refer to anyone belonging to the above mentioned categories that is handling a WCA.

As discussed herein above with reference to FIGS. 2A and 2B, a WCA is a set of elements packaged together including website building system components, associated code and additional elements. It will be appreciated that the included components may be atomic as well as container components and that components may also include third party applications (both front-end and back-end). A WCA may also include additional (lower level) WCAs, as well as regular components and containers.

A WCA can also be classified and understood in various different ways such as by their size or scope of provided elements/sub elements. It will be appreciated that WCAs can range in their object size (or scope) from a single component WCA (e.g. a button or an image field) to a WCA containing multiple interacting websites.

For example, a single WCA offering may include multiple related sub-WCAs of various sizes. This may be done by offering a WCA together with some of its elements which may be used separately and also through offerings which includes multiple WCAs (e.g. a primary WCA and a number of add-on related WCAs). These concepts are discussed in more detail herein below.

WCAs may also be classified by their sub-elements which may include front-end, back-end and associated code. They may also be classified by their level of abstractness, i.e. how detailed the WCA definition is on the continuum between a pure template/structure (which specifies minimal properties and is devoid of actual content) and an actual element (such as a ready-to-run vertical) as discussed in more detail herein below.

As discussed herein above, WCAs may come in different sizes such as a single component, with possibly some added customizations, as a set of components forming a layout, e.g. for an alternative layout suggestion (as described in U.S. Pat. No. 9,747,258 entitled "System and Method for the Creation and Use of Visually-Diverse High-Quality Dynamic Layouts" granted 29 Aug. 2017, assigned to the common assignee of the present invention and incorporated herein by reference.) and as a set of components forming a new composite component (such as the predefined smart composites described in US Publication No. 2018/0032626 entitled "System and Method for Implementing Containers Which Extract and Apply Semantic Page Knowledge" published 1 Feb. 2018 assigned to the common assignee of the present invention and incorporated herein by reference). WCAs may also be a page section, typically a horizontal edge-to-edge page strip (also known as coast-to-coast section), a page (such as a product gallery page, a checkout page, a thank you page, etc.), a page set/site section, a web site (or a template thereof) and a vertical application. A vertical application is a specialized web site adapted to a specific industry (such as e-commerce, hospitality, restaurants or law office) which may include additional subsystems (such as ordering, shipping or booking). The vertical application thus serves as a platform, which may be used as-is or customized. A WCA may also be a set of multiple cooperating (or otherwise interacting) websites or vertical applications (such as a multi-module ERP system). Thus, the size of a WCA may range from a single component or widget to a complete vertical application (such as a car selling platform) or set of applications.

It will be appreciated that system 200 may have multiple architectures for WCAs of different scopes. For example, system 200 may implement a simple version of WCAs (known as "shared parts") which only contain a single component or a simple arrangement of components. This may allow for a simpler arrangement of the storage of the WCA and its application in the containing applications.

A WCA may also include dashboard-based elements. A dashboard is a part of the website building system GUI (as opposed to a site GUI) which is accessible to the site owner but not to the site viewers/end-users 63. System 200 may allow the site owner to designate access to specific areas or elements of the dashboard to specific additional users logging into the website building system (e.g. by adding a role of a site operator which is distinct from that of the site owner).

Some of the dashboard GUI may be generic, while some may be site-specific. Such a dashboard may contain, for example, a specific GUI to display the order queue (for a restaurant site) or the product stock levels (for an e-commerce or logistics site) or to upload new content (e.g. new products) into the site.

A WCA may provide dashboard page(s) or parts thereof (such as a widget, a component or a page section). Such a customized GUI may include, for example, specific dashboard page sections which display the pending orders for a restaurant using a customized format.

A WCA may also include website building system UI (user interface) support panels (also known as "dialog boxes") or panel sections. A website building system GUI typically consists of multitudes of panels, including higher level ones (such as "my sites" or "media manager" panels) as well as lower level ones (such as panels shown while editing specific pages or specific components). The WCA may provide additional or alternate panels, panel sections (such as the menu sections described in U.S. Pat. No. 10,459,699 entitled "System and Method for the Generation of an Adaptive User Interface in a Website Building System" granted 29 Oct. 2019 assigned to the common assignee of the present invention and incorporated herein by reference) or panel behaviors (e.g. changes to system panel behavior which do not necessarily have a visual representation in the actual panel).

As an example, a WCA developer 64 may create a 'recipe book' WCA. The WCA may include a sub-element called 'single recipe summary' which displays a single recipe summary during site viewing. After installing this WCA (e.g. from an app store in website building system 5) via WCA app store manager 315, a site owner may be able to select (during site editing) which recipe the widget would show via WCA site viewer 320 during site viewing of the specific page. The recipes may be stored in a database associated with the installed WCA instance.

Thus for the example above, the recipe book WCA may provide an option called 'select recipe' which may open a new panel allowing for a recipe selection from the WCA's recipe repository (325/CMS 50) when used in the WBS editor 30 (e.g. as part of its website building system setting dialog/menu). These added options and panels may behave as though they are part of the regular website building system page/component editing GUI or otherwise may extend the GUI's behavior or interface. This may be known as a website building system panel WCA.

It will be appreciated that this new panel (as defined by the WCA) may include procedural elements (which may access repository 325/CMS 50) and which may be packaged as part of the WCA. Such a panel (and its associated elements) may be specific to a WCA, or may be shared between multiple WCAs types (e.g. the widget 'next recipe suggestion' might also reuse the same generic 'select recipe' panel).

It will be appreciated that WCAs (of all sizes) can include any combination of the sub-elements as described herein above. These elements may appear in WCAs of all types, including regular WCAs (which provide site or site elements), dashboard WCAs and website building system panel WCAs.

The WCA itself may also specify which of its sub-elements are encapsulated within the WCA (and therefore can't be accessed or viewed by the WCA user), which sub-elements are accessible by the WCA user, and which sub-elements can actually be modified by the WCA user at the instance level. These concepts are described in more detail herein below.

Figure 5:
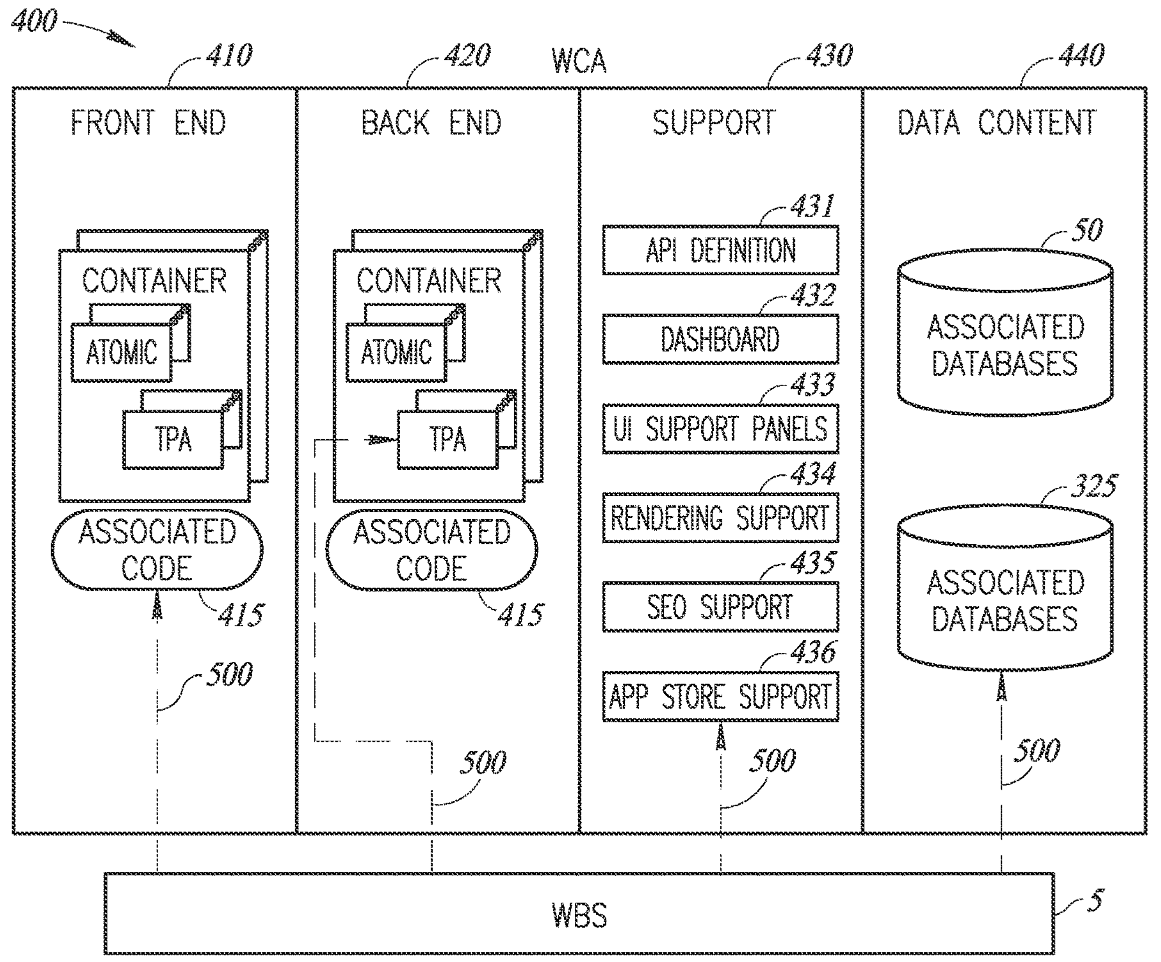
FIG. 5 is a schematic illustration of the various elements of an example WCA, constructed and operative in accordance with the present invention.

Reference is now made to FIG. 5 which illustrate how the sub-elements of a WCA 400 may be divided into four main categories, of front-end elements 410, back-end elements 420, support elements 430 and data content elements 440.

Front-end elements 410 may be a (typically hierarchical) set of contained components, such as atomic components, container components, third party applications and possibly, other WCAs and associated code, all related to the main activity of the application. For example, a "city visit" WCA may include a local weather WCA, a "things to do" WCA and a browse-able map WCA, with the appropriate links between all 3 sub-WCAs.

Back-end elements 420 may have one or more components running in the backend, such as atomic components, container components, third party applications and possibly, other WCAs, all related to backend activity of the application.

Support elements 430 may require interaction with other elements of website building system 5. For example, dashboard components 432 such as atomic components, container components, third party applications and possibly, other WCAs to be integrated into the website building system dashboard (as described herein above). API definition 431 may be the WCA developer defined specific API for the WCA. This could be a local API, a remote API (such as a web service) or both.

Content elements may include links or other references to databases (e.g. repository 325/CMS 50) of additional WCA-level components and attributes/properties, such as a city name in a weather widget or a like/share count in a social media widget together with an underlying database of content, including any combination of schema, data storage, database level code (such as data event hooks and triggers) and data relationships. This may also include any underlying databases data bundled with the WCA.

It will be appreciated that associated code 415 may include code running on the front end, the back end or both (as described in U.S. Pat. No. 10,209,966 granted 19 Feb. 2019, U.S. Pat. No. 10,326,821 granted 18 Jun. 2019 and U.S. Pat. No. 10,397,305 granted 27 Aug. 2019 all entitled "Custom Back-End Functionality in an Online Website Building Environment" and all assigned to the common assignee of the present invention and incorporated herein by reference). Such code may be visible to the user or encapsulated inside the WCA.

Other sub elements (not shown) may include data bindings (WCA⇔database 325/CMS 50) so that the WCA may be used in dynamic pages (as described in US Patent Publication No. 2019/0026082 entitled "Dynamic Preview of Database-Populated Web Pages" published 24 Jan. 2019, and issued as U.S. Pat. No. 10,521,198 on Dec. 31, 2019, assigned to the common assignee of the present invention and incorporated herein by reference) as well as regular pages providing data access and the ability to edit support panels 433, panel sections and other elements. These may include a configuration panel/dialog which may provide a specialized configuration setting dialog for the WCA. Such a dialog may be automatically generated to reflect the defined properties (as described in U.S. Pat. No. 9,753,911 entitled "System and Method for Dialog Customization" granted 5 Sep. 2017 assigned to the common assignee of the present invention and incorporated herein by reference) or otherwise marked properties, and may also be custom-coded.

Sub elements may also include editing behavior plug-ins (as described in US Publications No. 2018/0032626 and No. 2018/0293323, now issued as U.S. Pat. No. 11,449,573) which may define alternative editing behaviors for the element (e.g. allow resizing only between a number of predefined sizes) and specific manipulation handles (as described in U.S. Pat. No. 10,169,307 entitled "Method and System for the Use of Adjustment Handles to Facilitate Dynamic Layout Editing" granted 1 Jan. 2019, assigned to the common assignee of the present invention and incorporated herein by reference and US Publication No. 2018/0032626). These could be specialized handles that control geometrical properties of the WCA (such as resizing or rotating). These could also be handles which provide specialized control functions, such as to affect properties of some parts of the WCA but not others.

Another type of sub element may be frame elements which may be specific manipulation UI elements which are attached to the WCA's frame (in addition to geometrical manipulation handles) as described in US Publication No. 2018/0032626. Reference is now made to FIG. 6, which illustrates the recipe widget (400) described above and how it may have a set of special frame elements (for edit-time use) which have functions such as "next recipe" (a), "previous recipe" (b) and "random recipe" (c).

It will be appreciated that editing viewing support code in the editing environment may provide an improved look to the WCA during editing. For example, a video player WCA may provide a limited frame rate or reduced quality video preview which can run during editing without burdening the editing platform.

Further sub elements may include rendering support code 434 affecting component run-time rendering, including specific server-side pre-rendering behavior and SEO support code 435 affecting SEO and indexing support, allowing for specialized handling of components during (spider) indexing and retrieval (as described in U.S. Pat. No. 9,436,765 entitled "System And Method For Deep Linking and Search Engine Support For Web Sites Integrating Third Party Application and Components" granted 6 Sep. 2016 and US Publication No. 2019/0026280 entitled "Website Builder With Integrated Search Engine Optimization Support" published 24 Jan. 2019, and issued as U.S. Pat. No. 11,314,837 on Apr. 26, 2022, both of which are assigned to the common assignee of the present invention and incorporated herein by reference). App store support 436 may provide App-store related information such as name, description, commercial information and version information.

WCA variations may provide alternatives for some elements of the WCA, while some of the elements remain constant. For example, a single WCA may provide multiple variations for its design (e.g., one that is left justified and one which is right justified), while using the same code for these multiple designs. Alternatively, a single design may have multiple variations with different versions of the code attached to the WCA elements. Different variations can also each have some different design elements and some different code elements.

Such functionality may allow (for example) designers 62 to create a different look and feel without involving code writers. This capability is different from the use of skins as the layouts may be radically different, have different UI and customizations, and possibly different functionality.

WCA handler 370 may select which variant to use based on the available information such as the website elements of the site that includes the WCA, the system configuration (e.g., which third party applications and verticals were purchased) together with user collected information such as geographical location, language, editing history, collected business intelligence (BI) etc. WCA handler 370 may also provide multiple variants to the user (possibly filtering them according to the available information noted above), and allow the user to select which one to use as described in more detail herein below.

In addition to variants, the WCA may include optional parts (typically hidden from display in the some WCA configurations), which are activated based on the available information (automatically) or on user selection as noted above.

It will be appreciated that system 200 may maintain a dual outlook for a WCA both as a single packaged entity and as a set of customizable elements (which may be visible and/or editable by users for sites using the WCA). Different WCAs may allow different levels of access to their "internals" as discussed in more detail herein below. The pertinent web site building system may interact and handle both the WCA as a single element and as constituent elements as represented by the dashed lines 500 in FIG. 5 back to which reference is now made.

As discussed herein above, a WCA may be built having different levels of abstractness. On one hand, a WCA may be abstract, providing (for example) just a set of abstract components (also known as a layout) which can be used to format pages. The user (e.g. site designer 62) would have to fill them with content, edit their attribute and possibly modify their type (e.g. changing one gallery type to another). At the other end of the continuum, a WCA may be a fully functional site, site section or vertical application. Such a WCA would include all required front-end and back-end elements, the underlying code, relevant initial content etc. as discussed herein above.

It will be appreciated that WCAs may be created with any level of abstractness on the continuum between these two examples (e.g., specifying some of the component's elements and attributes, while leaving other elements and attributes unspecified or as a default).

It will be appreciated that WCAs may be constructed inside a given site (for use in the specific site), or may be packaged so as to be used in multiple sites. This could be used for different sites of the same user or owner, or for use in other sites. In the latter case, the WCA may be offered via an application store (run by website building system vendor 61 or a third party). Such a packaged WCA is often referenced as a plug-in WCA.

It will be appreciated that once a WCA or a plug-in WCA is made available for the website building system tool palette UI (as described in U.S. Pat. No. 10,459,699). WCA in-site editor 330 may be used by the user to edit all elements of the WCA, including in particular its components, layout and front end/back end code, as permitted by the WCA provider (which may lock some parts or elements of the WCA against some or all types of editing as further discussed below).

System 200 may handle the packaged WCA (or plug-in WCA) as essentially a higher-level component (or other website building system element) which still consists of sub-elements, and possibly additional elements. Each of those sub-elements may retain full editing capabilities such that it retains both full functionality as an atomic-level element, but also within the WCA and its semantic role within the WCA.

Reference is now made to FIG. 7A which illustrates the elements of WCA handler 370. WCA handler 370 may further comprise an alert provider 372, a WCA modification handler 373, a feedback provider 374, a ghost module 375, a masquerader 376, a database connector 377, an API handler 378 and a machine learning (ML)/artificial intelligence (AI) module 379. The functionality of these elements is discussed in more detail herein below.

Reference is now made to FIG. 7B which illustrates the elements of ML/AI module 379. ML/AI module 379 may further comprise a decision engine 3791, a CMS extractor and trainer 3792, an element behavior tracker/trainer 3793, an element behavior ML/AI module 3794 and a merging ML/AI module 3795.

ML/AI module 379 may provide decisions for ghosting module 375, masquerader 376 and the merging functionality of WCA modification handler 373 as discussed in more detail herein below. ML/AI module 379 may train the machine learning models implemented by element behavior ML/AI module 3794 and by merging ML/AI module 3795. ML/AI module 379 may train both modules (3794, 3795) based on the data extracted by CMS extractor/trainer 3792 from CMS 50 and WCA repository 325 (including site and user parameters, as well as user collected information such as editing history and business intelligence information). ML/AI module 379 may further train both modules (3794, 3795) based on tracking the behavior of WCAs and their elements (including code execution paths, user interactions, inputs/outputs, data exchanged, API calls, internal services invoked, etc.). Decision engine 3791 may make decisions based on element behavior ML/AI module 3794 to support ghost module 375 and masquerader 376 in performing their function. Decision engine 3791 may further make decisions based on merging ML/AI module 3795 to support WCA modification handler 373 (and its merging functionality in particular) in performing their function.

ML/AI module 379 may implement any machine learning/artificial intelligence algorithms, including in particular Long Short Term Memory (LSTM) neural networks (to handle sequences such as editing history and BI data) and convolutional neural networks (to handle geometrically defined data, such as component layouts).

Figure 8:
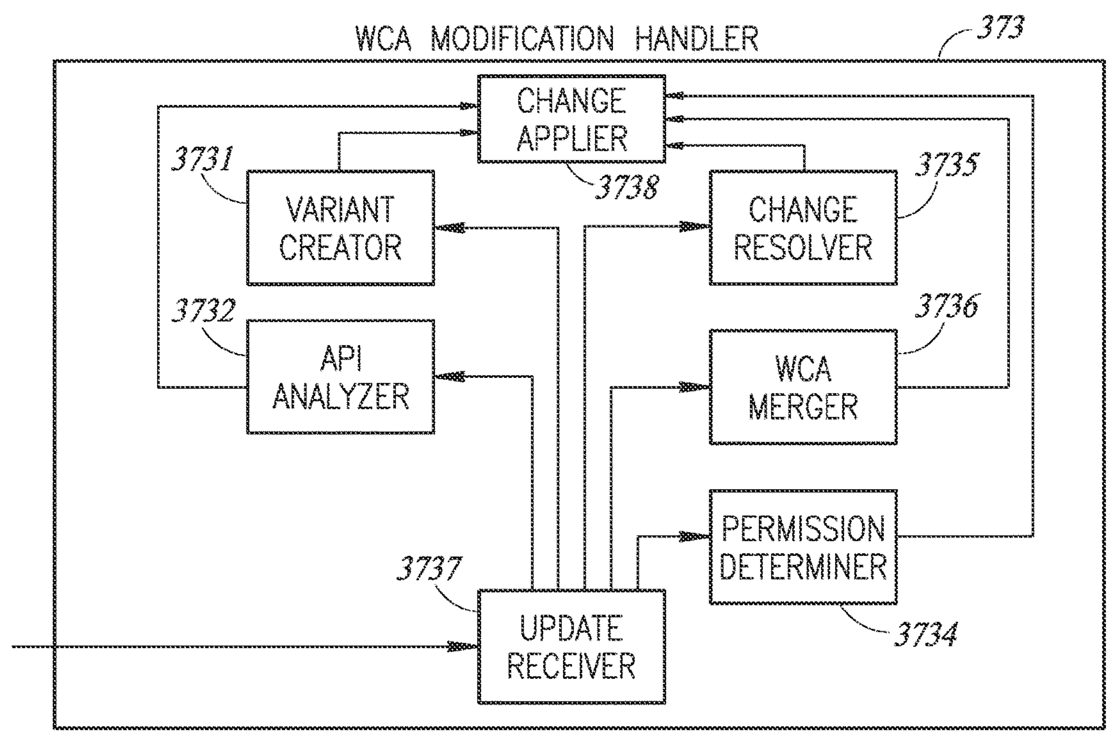
FIG. 8 is a is a schematic illustration of the elements of the WCA modification handler of FIG. 7, constructed and operative in accordance with the present invention.

Reference is made to FIG. 8 which illustrates the elements of WCA modification handler 373. WCA modification handler 373 may handle modifications to WCA such as variant creation and customization. WCA modification handler 373 may further comprise a variant creator 3731, an API analyzer 3732, a permission determiner 3734, a change resolver 3735, a WCA merger 3736, an update receiver 3737 and a change applier 3738. The functionality of these elements is discussed in more detail herein below.

It will be appreciated that WCAs may be created using WCA app builder 360 and further edited using customization panel creator 361 and dialog editor 362. Dialog editor 362 may be typically focused on editing the WCAs definition themselves, whereas customization panel creator 361 is typically focused on editing the various WCA-specific customization panels which are associated with the WCA, and which may be displayed during editing (or in some cases during run-time when some editing capability is available during run-time) to help in configuring the specific WCA instance. Such customization panels may be displayed in conjunction with the WCA (e.g. on its boundary), or may be embedded into the WBS main editing UI. In alternative embodiments, they may also be edited using WCA in-site editor 330 and the regular WBS editor 30 which may be extended by additional capabilities to support WCA editing.

WCA in-site editor 330 and WCA app builder 360 may function separately or may be integrated together and each may consist of a single integrated editor or multiple visual editors (e.g. one for each of the contained components, the property panel and the frame elements/handles/editing behavior add-ons etc.).

It will be appreciated that such creation and editing may be performed by the original WCA developer 64. The WCA developer 64 may further specify if the WCA can be edited by site designers 62 who use the WCA (i.e. at the instance level), and if so which sub elements of the WCA may be visible and which may be edited.

System 200 may also allow some level of end-user 63 editing capability, such as allowing end-users to edit component-based blog posts which are posted to a blog system (including having multiple end-user levels as far as editing is concerned). In this scenario, the WCA developer 64 (which developed the blog WCA used in this exemplary blog system) may also specify what areas and elements are editable by end-users/viewers 63, and in which way. System 200 may allow such specification to be made by the WCA developer 64 or by the site designer 62 who designed the site used by end-users/viewers 63 and according to User Change Acceptance rules described in more detail herein below.

Thus, the WCA developer 64 may determine, for example, that the WCA components may be edited, but not deleted and that new ones may be inserted. He may also determine that the WCA code is neither visible nor editable to designers 62 using the WCA. Such determination may also apply to additional elements of the WCA, such as its customization/settings panels.

System 200 may provide different levels of granularity for such configurations (i.e. what is visible and what may be edited), including WCAs of different sizes as described herein above. At the simplest level, system 200 may allow WCA developer 64 to specify that the WCA may not be edited (i.e. the WCA is locked in "factory settings"). In an alternative embodiment, it may allow WCA developer 64 to specify highly detailed rules (similar to the User Change Acceptance (UCA) rules described below) regarding which components and attributes may be edited and in what ways. Such rules may specify editing limitations such as sub-component positioning change limits, attribute change limitations (e.g. which fonts can be selected), whether inserts/deletes are allowed etc. As discussed herein above, system 200 may allow the WCA developer 64/designer 62 to delegate part or all of these capabilities to the WCA user which may in turn specify such rules applying to end-user editing (if available). It will be appreciated that limiting the scope of editing for a given WCA may make the merging of edits from multiple sources (as described in more detail herein below) much easier.

Update receiver 3737 may receive updates from all levels of user and may coordinate them accordingly with the other elements of WCA modification handler 373.

Permission determiner 3734 may prevent updates and modifications (or parts of thereof) from occurring at all. It will be appreciated that permission determiner 3734 may therefore prevent future WCA breakdowns as well as any incompatibilities in design etc. A typical embodiment may initially place the WCA in "locked mode". In this locked mode, permission determiner 3734 may handle permissions for users that are editing and may lock the WCA's sub-element's position and size, and prevent the user from deleting any sub-element. However, the user may be able to change (for example) the style, font, and content of the various sub-elements. This way, updates may be easy to integrate (as discussed in more detail herein below).

In such an embodiment, the user may specify that the WCA should be unlocked, and that the WCA may not be changed or may only be partially changed (such as allowing code updates that do not affect the layout of the WCA). Alert provider 372 may warn the user before any such unlocking is done.

It will be further appreciated that there may be multiple types of customization available for a WCA. At one level the WCA may be modified by editing its elements (creating a variant WCA). At a different level, a WCA instance may be modified "in place" (i.e. inside the page/site in which it resides), without creating an alternate WCA. Such instance customization may also take into account (and integrate with) other elements in the WCA's environment, such as the containing page/site. The customization may differ from instance to instance, and may also be dynamic in nature (e.g. change as the site is used or otherwise based on external inputs and triggers). WCA modification handler 373 may handle both automatic and manual customizations.

A WCA instance may be customized, for example, using any of the following methods or a combination thereof. It may be customized using a pre-packaged API provided with the WCA. This may be made, for example, through user-written code via WCA in-site editor 330. The pre-packaged API may be similar to those provided by regular components in the website building system (as described in U.S. Pat. Nos. 10,209,966, 10,326,821 and 10,397,305). For example the code "$w('#VisitCityWCA').city='London'" may be edited to change the city name.

Figure 9:
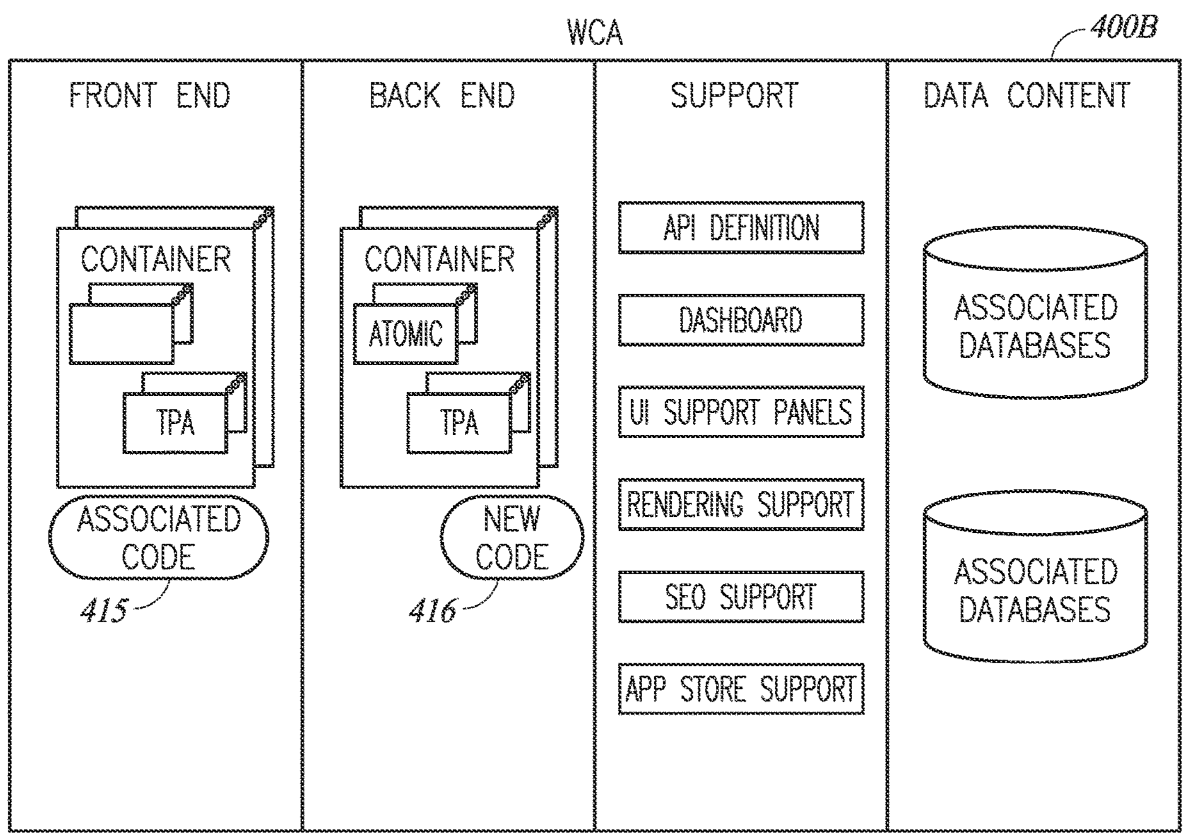
FIG. 9 is a schematic illustration of a modified version of the WCA of FIG. 5, constructed and operative in accordance with the present invention.

Variant creator 3731 may allow an edited WCA to be saved and used as a WCA variant by itself (also known as a "fork"). System 200 may limit the ability of the edited WCA to be further re-distributed, e.g. uploaded to an app store for further use. Reference is now made to FIG. 9 which shows the WCA of FIG. 5 (now 400B) where the back end associated code 415 has been removed and new code 416 has been added.

Alternatively, variant creator 3731 may also allow such re-distribution, e.g. WCA developer A creates a WCA X and publishes it as a plug-in, WCA developer B creates a modified version X* of the plug-in and re-publishes it and WCA developer C uses X* in his site, possibly further modifying it into X. The distribution may be done though app store(s) (via WCA Appstore manager 315), and system 200** may implement a revenue-sharing model between the original WCA developer (A above) and modified version redistributors (B above).

It will be appreciated that the arrangement described above (variation creation) in which a WCA is created based on another WCA may be regarded as an inheritance arrangement. System 200 may also support multiple inheritance, i.e. creating a WCA which combines elements from multiple WCAs.

A WCA instance may be customized using a UI panel automatically generated from the WCA's pre-packaged API. In this scenario, API analyzer 3732 may analyze the WCA's pre-packaged API to detect the API's properties and interfaces and generate a matching settings panel. API analyzer 3732 may further populate the settings panel with default values based on properties in the WCA's API.

Thus, for the API example above, API analyzer 3732 may produce a settings panel allowing the user to enter a city value for the WCA 'VisitCityWCA'. It will be appreciated that this method may be more useful with static attributes, as dynamic attributes (which change during WCA runtime) may typically require use of the API to dynamically specify their value.

WCA analyzer 363 may recognize repeating or hierarchical elements in the WCA structure, and accordingly, generate lists and nested elements in the generated customization panels. Such an analysis may also produce source code elements (such as setters and getters) for use when including the WCA in a larger application. These may be used by WBS editor 30 when creating code in the containing application. It will be appreciated that WBS editor 30 may generate a template for the required code. When a WCA is used, WCA analyzer 363 may also generate template code for the code editor to help in handling the WCA API.

Customization may also be performed using methods pre-defined by WCA developer 64 such as custom-built panels. Customization may also be performed manually via WCA in-site editor 330 or WBS editor 30 by the user by adding or removing WCA sub-components, by changing the WCA sub-components through their regular editor menus and panels and by writing code which works with the WCA's sub-components i.e. code added as a layer above the WCA's own handling of those sub-components. It should be clarified that these WCA sub-components may typically be regular WBS components (which already have their existing default customization menus and panels). For example, a video player WCA may use a button as a 'play video' button, but the WCA instance customization may add code which listens to clicks on that button (or to WCA events in general) and executes some additional code, such as code incrementing a counter on the page (e.g. a video views counter). Such customization may be available even if the WCA's internal code is hidden (encapsulated) as discussed herein above. In these scenarios, WCA modification handler 373 may receive these edits and implement them accordingly.

WCA analyzer 363 may also perform static source analysis on WCAs. Such analysis can be used by customization panel creator 361 to generate customization panels (similar to panel generation based on API analysis as described herein above). Such analysis can also be used to determine the permission required for the WCA to run, and request the WCA user to confirm the grant of the required permissions for use by permission determiner 3734.

As discussed herein above, customization panel creator 361 may thus automatically create customization panels which contain the relevant elements for WCA customization including WCA-specific properties which may not exist in any of the components comprising the WCA (as described in U.S. Pat. No. 9,753,911).

As discussed herein above customization panel creator 361 and dialog editor 362 may further provide an editing environment for the operational UI (e.g. buttons, toolbars and menus) of the website building system used in conjunction with the WCA. WCA site viewer 320 may support WCA viewing during runtime.

It should be noted that such UI editing may be at a separate level from the creation of customization panels for the WCA. The regular customization panels may be used by users who just customize the WCA (i.e. modify pre-designated attributes of the WCA). Customization panel creator 361 and dialog editor 362 may allow for modifying the UI of the WBS editor 30 for users who want to actually edit the WCA (e.g. add/remove/modify components of the WCA), including people creating a derivative (inherited) WCA variant. An example implementation of a UI is described herein below.

In particular, system 200 may provide a building environment which allows a WCA developer 64 to edit the UI and any interactions at the WCA level and at the sub-element level. Thus (for example), WCA developer 64 may create a video player WCA which uses a plain button as a play button. WCA developer 64 may create new editing experiences for the WCA user both at the video-player level and at the play-button level (so it becomes a slightly different entity than a plain button).

It will be appreciated that multiple such changes to the editing environment (resulting for example from the use of multiple WCAs, each having its own set of editor UI changes) may conflict with each other. Change resolver 3735 may resolve such conflicting changes when the changes are introduced in real-time or during editing. Change resolver 3735 may take into account (for example) the user's profile, editing history, user editing behavior, current editing focus, site/page/WCA related parameters, collected site BI, etc. in order to resolve the conflict. Such resolution may be fully automatic, semi-automatic or manual (involving WCA developer 64).

WCA developer 64 may update the original WCA and distribute the changed version, even if site designers 62 using the WCA have made instance-level changes to the WCA. Such updating may be done by merging (for each instance of the WCA in use) the two sets of changes (WCA developer 64 changes and site designer 62 changes) as further described below.

It will be appreciated that system 200 may implement a physical update distribution architecture, in which changed versions of the WCA are actually delivered to WCA client site instances. Such distributed updates may contain the full changed WCA or be differential in nature.

System 200 may also implement a by-reference/inheritance-based architecture in which a site using a given WCA only, includes a reference to a centrally stored version of the WCA. System 200 may still store multiple copies of the master version in some cases, e.g., to support localized caching. The technologies and capabilities discussed below are all applicable to embodiments which use physical (full or partial) update distribution, as well as embodiments which use the by-reference/inheritance-based method of updating WCAs. In the latter case, the various system elements in discussion may operate at any phase of the functionality of system 200, including page creation, saving, publishing or during run-time (e.g., when pages are dynamically constructed for rendering and the WCA updates from multiple sources are handled and merged in real-time).

WCA CMS coordinator 350 may store in database 325 (or in CMS 50) the local changes made by the site designer 62 for the specific WCA instance in the specific site. These local changes may also include other parameters and settings, such as selection of WCA variant to use or the specification of a base parameter such as a city selection for a "Local news" WCA.

It will be appreciated that WCA SGS interface 340 may dynamically integrate a WCA into a page whenever the page is loaded, e.g., when the page is edited or viewed (including the changed master version and any local changes and parameters). Thus, the page will always reflect the latest update of the referenced "master version" of the WCA. This dynamic integration may apply any of the rules or policies described below to this dynamic integration process (such as "limit updates from master copy to code changes only but not layout").

WCA handler 370 may also implement silent updates, which WCA handler 370 may distribute to client sites (which use the WCA) without notice. Alternatively, WCA handler 370 may distribute updates together with additional information that will be presented to the user on receipt of the updates. Such additional information may include interactive elements (displayed before, during, or after installation), such as a user confirmation form, feedback requests, training, and documentation for the update to be presented. The additional information may also include code or condition definitions for the installation of the update. This also applies to the by-reference architecture (which doesn't have an explicit update distribution operation) as the page integration process may detect that the master copy of the WCA has been changed during editing, and present the additional information noted above to the site designer. The same process may also be employed in the live site (i.e., during run-time) to present the changed version to the end users, possibly including additional information (e.g. "Press here to learn about the new 'city tour' display" button).

WCA handler 370 may support update installation during run time for some or all of the updates for a WCA. In such a scenario, the update may be applied to instances currently executing on the server or the client side of the web site containing the WCA. It will be appreciated that the client-side installation may require updating end-users accessing the web site. Such a run-time update may not always be possible, as running code cannot be "switched while running" in many cases, and system 200 may determine if this is possible based on the current WBS running context.

WCA modification handler 373 may also allow a WCA user (such as a site designer) to specify the update installation policy for a given WCA instance in the site the user is creating or editing. For example, update receiver 3737 may allow the WCA user to specify that updates would be automatically installed (also known as "formal layout" or "classical layout") or not installed (known as "customized layout"). In the latter case, the user is said to be "disconnected" from the updates stream.

Permission determiner 3734 may implement a policy under which some elements of the WCA are changed, and some are not. For example, WCA modification handler 373 may elect always to update the WCA code elements but not update the WCA layout (component choice, placement, sizes) unless explicitly approved. The update may also be conditional on whether the element has been modified by the WCA user such as "only modify the layout if the user hasn't modified it before" (looking at the entire WCA layout or sub-elements of the layout at a given granularity). Under such a policy, the two parts may get out of sync at some point, as the code may break down once the layout has been modified too much. It will be appreciated that such merging may also work if the site designer modifies a WCA in order to create a local variant, or even if such variant was published and used by additional parties.

Change applier 3738 may apply any modifications according to the output of the other sub elements of WCA modification handler 373.

Figure 10:
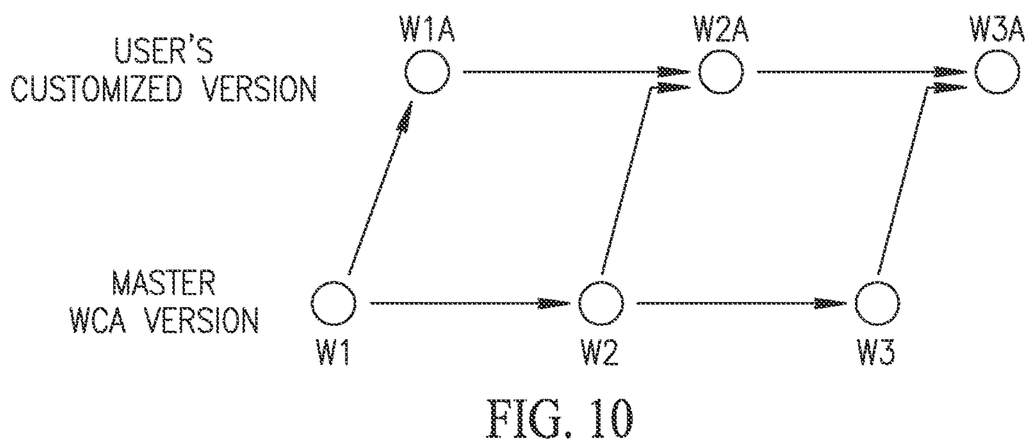
FIG. 10 is a schematic illustration of how different version of a WCA may be deployed while merging changes made by a WCA user, constructed and operative in accordance with the present invention.

It will be appreciated that the description below of WCA merger 3736 and its elements below may also be applicable to an inheritance mode in which changes are merged online. Thus, WCA modification handler 373 may handle an initial version of a WCA (W1), a follow-up version of a WCA (W2) and a modified version of W1 as customized by the site designer (W1a) as illustrated in FIG. 10 to which reference is now made.

Figure 11:
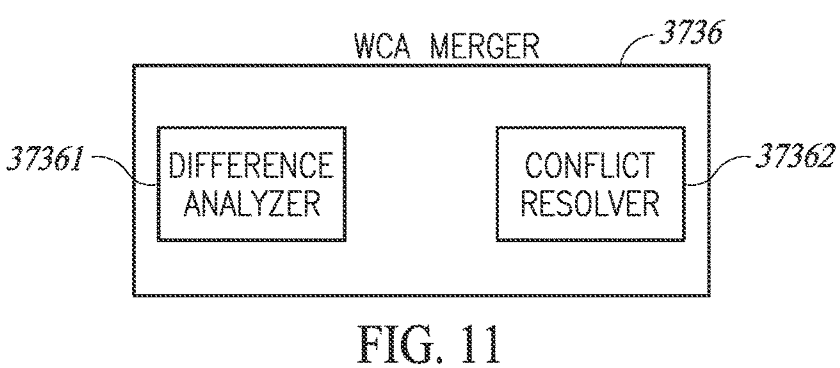
FIG. 11 is a schematic illustration of the elements of the WCA merger of FIG. 8, constructed and operative in accordance with the present invention.

WCA merger 3736 may implement such merging by handling the changes made to the WCA as attribute overrides/modifiers (which modify existing attribute values). Reference is now made to FIG. 11 which illustrates the elements of WCA merger 3736. WCA merger 3736 may further comprise a difference analyzer 37361 and a conflict resolver 37362. The functionality of these elements is discussed in more detail herein below.

Figure 12:
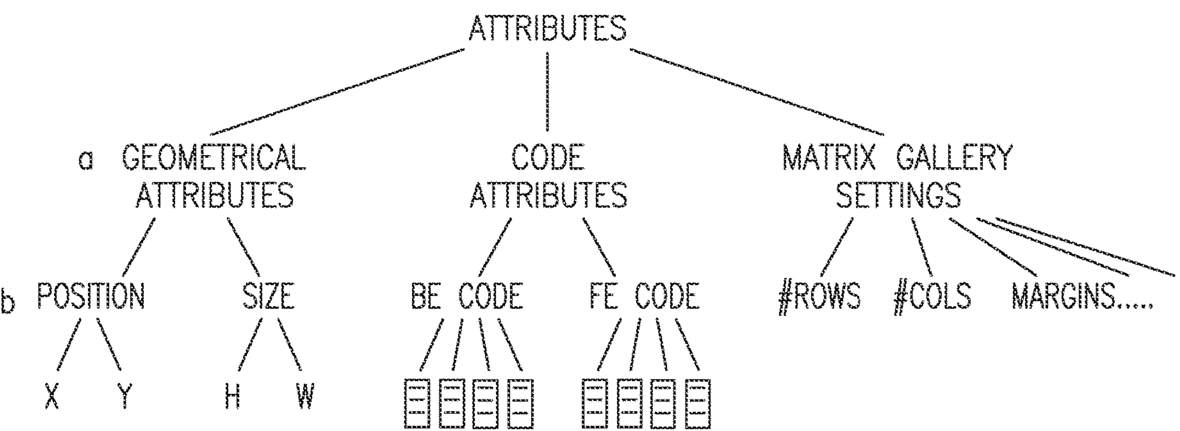
FIG. 12 is a schematic illustration of a WCA attribute tree, constructed and operative in accordance with the present invention.

Difference analyzer 37361 may arrange the attributes of each object in the WCA as an attribute tree. Reference is now made to FIG. 12 which shows an attribute tree with a geometrical attribute node (a) with sub-nodes (b) being "position" and "size" and sub-sub nodes (b) being x, y, height and width (the position attribute may be the component's position relative to its container). An attribute tree may also have a "code attributes" node, with sub-nodes being "backend code" and "frontend code", and with sub-sub-nodes being the code snippets associated with specific triggers. Yet another node may be a "matrix gallery settings" node, with sub-nodes for the numbers of rows and columns, the specific margins used etc.

Different implementations or embodiments may have different levels of granularity for their attribute trees. For example, for a color attribute, one implementation may have separate attribute nodes for each of the R, G and B color components whereas another embodiment may use a single "color value" attribute nodes (which combine the R, G and B elements).

Thus, any changes made to W1 (such as when creating W1a as shown in FIG. 10 back to which reference is now made) may be stored as a set of modifiers to attributes (e.g. set color attribute to red). WCA in-site editor 330, dialog editor 362 and customization panel creator 361 may also provide an editing option of "reset to inherited value" (re-inherit) for specific attributes (at various node levels) in order to restore the specific attribute node to inheriting the original value (i.e. by canceling the attribute node modifier).

It will be appreciated that WCA developer 64 may edit the WCA component (i.e. the W1 to W2 editing of FIG. 10) using WBS editor 30 as a regular website building system component modification, and may store some or all of the changes made by the WCA developer 64 as a set of attribute modifiers as well in CMS 50.

Thus, WCA merger 3736 may re-apply or merge the W1a modifications (originally made to W1) into W2 to create a merged version W2a as discussed in more detail herein below. The process may continue with a further version, e.g. the user may modify W2a to create W2b, and WCA merger 3736 may apply such changes to W3 to create W3b.

It will be appreciated that when creating a merged changed version (e.g. W2a in the example above), difference analyzer 37361 may analyze and gather change set #1 (W2 vs. W1—the WCA developer 64 changes), analyze and gather change set #2 (W1a vs. W1—the WCA user changes) and then merge the two sets of changes (vendor and user) to create W2a.

It will be appreciated that difference analyzer 37361 may perform the difference analysis and change set gathering described herein using a number of techniques which benefit from the component-based architecture of the underlying system. Such techniques (as described in U.S. Pat. No. 9,817,804 entitled "System For Comparison and Merging of Versions in Edited Websites and Interactive Applications" granted 14 Nov. 2017 and U.S. Pat. No. 10,176,154 entitled "System and Method For Automated Conversion of Interactive Sites and Applications to Support Mobile and Other Display Environments" granted 8 Jan. 2019 both of which are assigned to the common assignee of the present invention and incorporated herein by reference applications) may include, for example, any of the following: the underlying website building system component IDs; locating geometrical and semantic relationships between the components; analysis of the component attributes and content; analysis of the component editing history and smart ordering of the components at each hierarchy level (so that linear comparison and merging algorithms known in the art may be used).

Difference analyzer 37361 may further analyze any changes made to the code associated with the WCA (be it back-end or front-end code). Such an analysis may use regular code text analysis as well as object-based analysis which may benefit from the association may between code segments and sub-objects of the WCA.

Difference analyzer 37361 may also handle the use of external editing tools by the user and detect changes which it cannot explicitly track. For example, elements of the code may be edited using an external code development tool which completes the internally provided code editing tools. As another example, WCA modification handler 373 may allow the export to and import from a standard format (such as XML) of some WCA elements, and such external standard file may be editable using external tools.

In such cases, difference analyzer 37361 may find it difficult to follow the "editing history chain" which details the changes made to the WCA. In particular, such a "chain" may have gaps due to elements being edited using an external tool and re-imported into system 200.

Difference analyzer 37361 may analyze such gaps, and create an expanded editing history chain which provides a more complete outlook of the editing steps made by the person editing the WCA (be it vendor or user). Such gap analysis may be fully automatic or assisted by the editing person. Difference analyzer 37361 may also implement such a gap analysis by performing a component-based comparison between the pre-gap version and the post-gap version in order to establish the changes made by the user in the external tool.

An example technology to perform such component-based comparison is described in U.S. Pat. No. 9,817,804, e.g. as performed by the comparer and merger 650 (and by the version comparer 655 and version resolver 656 in particular) as described therein.

Difference analyzer 37361 may also make use of website building system component ID's. It will be appreciated that such comparison and analysis often uses website building system component ID's (as described for ID based matcher 721 in U.S. Pat. No. 9,817,804). However, with external editing such website building system ID's are often lost.

System 200 may add such ID information to the exported/imported component metadata which may be preserved by the external editing. Difference analyzer 37361 may also re-establish such ID's after import based on any ID's preserved in the metadata, or based on the results of the comparison process itself (e.g. re-insert the ID from the pre-gap component to its located post-gap counterpart).

It will also be appreciated that a person editing the WCA may sometime perform editing steps which are difficult to automatically analyze or follow. For example, a user may replace a video player "play" and "stop" buttons ([A] and [B] respectively) with a toggle switch [C] (with "playing" and "stopped" states). Such a replacement may involve deleting the two existing WCA buttons, creating a new WCA toggle switch and specifying new associated code (and functionality) for [C] which are similar (but different) from the code used in [A] and [B].

Difference analyzer 37361 may be able in some cases to understand such a change on its own (e.g. based on the various types of analysis described herein above). For example, difference analyzer 37361 may be able to understand the change based on the sequence of operations in the editing history (e.g. a two component deletion followed by a component creation). As another example, difference analyzer 37361 may be able to understand the change based on the new toggle [C] occupying the same geometrical area in the WCA previously occupied by [A] and [B].

However, in many cases difference analyzer 37361 may not be able to recognize the change for what it is. To resolve this, system 200 may also provide a capability for the editing person (vendor or user) to specify merging hints in conjunctions with the editing process. Thus, in the example above, the editing person would specify that [A] and [B] have been merged to form [C].

As an alternative to merging hints, system 200 may support active semantic tags which tie specific components or other triggers (such as "active area" in an image) to a given event activating (for example) some WCA code. An example would be having the editing user manually assign multiple objects (say "Play" button [X] and UI image [Y]) with active semantic tags associated with the video playback function.

It will be appreciated that such hints and tags (and the resulting understanding) may be used by change applier 3738 (as further described in more detail herein below). For example, based on this knowledge, change applier 3738 may (in the scenario described above) apply a new color used for [A] and [B] to [C] as well.

As discussed herein above, when creating a merged version W2a of the WCA, WCA merger 3736 may be required to merge two sets of the changes, the vendor set (W1=>W2) and the user set (W1=>W1a). These two change sets may (and often will) include conflicting changes. For example, a given attribute [a] of object [X] is set to the value [a=v1] in one change set and to the value [a=v2] in the second change set. As discussed herein above, object/component attributes may include design-related, code-related and other classes of attributes. For example, the two change sets may involve assigning two different database tables to be used for a "source data" attribute of a given list display field [X].

The conflict may also be related to the actual existence of the component or its sub-elements. For example, one change set may set some attributes [a, b] of a given object [X], while a second change set may specify that [X] has been deleted altogether. Such two sets are clearly in conflict.

Conflicts may also arise involving multiple components with clashing or incompatible attributes or behaviors. For example, in one change set a given component [X] was moved to a given (and now empty) screen area [r] inside the WCA. In the second change set, a different component [Y] was moved to the same area [r]. Theoretically the two components [X] and [Y] could be displayed in [r], but one of them would overlap the other. As another example, the two change sets may change the colors of an object and its containing object to identical or very similar colors, causing the two objects to "blend" visually.

Another conflict area is dynamic behavior or functionality. An example would involve each change set including its own time-based trigger which plays a (separate) music file in the background. This may work in some cases if there are clear (and mutually exclusive) conditions for the music to start in each of the time triggers. However, playing two music files at the same time may not work for a typical user.

WCA merger 3736 may use a smart merging process which is adapted to and uses information available in the WBS and its various repositories, including current information (such as component hierarchy, structure, semantics, geometry, associated code definitions etc.) as well as collected information (such as editing history and business intelligence (BI)).

It will be appreciated that in a typical embodiment system 200, the handling of the two change sets by WCA merger 3736 is not symmetric since the changes made by WCA developer 64 may take precedence over the changes made by the user (for example site designer 62). This is typically recommended since the WCA developer 64 changes may be very substantial (e.g. releasing a completely new version of the WCA) whereas user changes tend to be smaller in scope or more superficial.

As discussed herein above, difference analyzer 37361 may analyze the user change set (W1=>W1a). Change applier 3738 may then re-apply these changes to the new version of the WCA (W2 in the example above) and conflict resolver 37362 may resolve conflicts whenever conflicting changes are detected. It will be appreciated that such merging/re-applying and handling of conflicts may be done in a number of ways (or a combination thereof) as detailed herein below.

Conflict resolver 37362 may simply discard changes from the user change set whenever they conflict with changes from the WCA developer 64 change set. Thus, the vendor change set would completely override the user change set.

Conflict resolver 37362 may interactively consult with the user to determine how to resolve each conflict. Conflict resolver 37362 may also add elements of assistance and automation to the manual interaction. This may be implemented, for example, by tracking the responses for the current user (or other users) and gradually providing recommendation for conflict handling based on the collected responses and their analysis.

As discussed herein above, ML/AI module 379 may provide decision making support for conflict resolution during the merging process based on information extracted from CMS 50.

It will be appreciated that AI/ML merging module 3795, may provide such recommendations for such conflict resolution. Thus, as system 200 is used more and more, AI/ML merging module 3795 may provide better recommendations to the user regarding merging of changes. It will also be appreciated that the analysis and use of additional user responses may be done based on the classification of other users' answers according to parameters related to the resolved conflict (e.g. what are the vendor and user changes involved) or the users themselves (e.g. geography, experience etc. as described for example in U.S. Pat. No. 10,073,923). ML/AI module 379 may also provide interface with WCA modification handler 373 in order to directly apply merging recommendations without the user's involvement. It will be appreciated that AI/ML merging module 3795 may operate using known machine learning/artificial intelligence algorithms or use any decision engine technology.

In yet another option, the vendor's new version W2 may include a set of User Change Acceptance (UCA) rules. These rules (which may be stored in CMS 50) may control which of the changes included in the user's change set should be applied to W2 and in which way. The rules may be applicable to all user changes, or only to conflicting user changes. The rules may include conditions on any system aspect, such as the relevant object and attribute(s), the attribute values (original or in either change set), the nature of the user or vendor change to apply, the nature of the conflict (if any), parameters of the editing history underlying both changes and existing version information, page/WCA information etc.

One extreme example would be a W2 version which is a major upgrade or re-design of W1. In such a case, W2 may be released with a "discard all user changes" UCA rule, as none of the changes made by users to W1 are expected to be relevant (or technically applicable) to the heavily modified W2. In this scenario, all instances of W1a (for all users) would be reset to the unmodified W2, i.e. returning all W2 instances to the "factory settings" state (though the W2 update may define some exceptions for some users for which the W2 instances will not be reset).

In another example of UCA rules, system 200 may allow limited types of user changes to override conflicting vendor changes, but would otherwise use the vendor changes. For example, system 200 may allow some design-related user changes (e.g. colors or fonts) to override vendor changes, and prevent other user changes from overriding conflicting vendor changes.

In yet another example, the UCA rules may include conditions based on the specifics or parameters of the changes. For example, a UCA rule may direct change applier 3738 to apply user changes to WCA sub-elements size and position, but only if these changes are limited so as not to break the basic visual structure of the WCA.

As another example, system 200 may allow user changes related to WCA integration (such as which database are used, interfaces to other components etc.) to override matching vendor changes. This way the new W2a version may be incorporated into the containing page already connected with the right data sources and interfaces.

As discussed herein above, a WCA may be described as a set of sub-elements (front end code, back end code, UI component etc.), each of which consists of a hierarchy of objects/components (e.g. website building system components), each having a hierarchy of attributes. The sets of differences between WCA versions may also be similarly structured, and the structure may in turn define a natural hierarchical model for the change sets.

However, change applier 3738 may also classify the changes into larger areas or groups based on a simplified model. An example would be classifying WCA changes into generic areas (such as layout, data, front end code, back end code and others) or into WCA-specific areas (such as specific sub-regions of the WCA).

System 200 may allow the user to determine which changes to apply and how on an area by area basis (e.g. for all changes in a given area together), using the complete hierarchical structure model above or using the simplified areas.

For example, modification handler 373 may update the WCA visual layout (i.e. the set of visual sub-elements and the layout information) separately from the WCA code, so that a WCA user (site designer) can update his WCA instance to a new version of one of them (layout/code) but not the other.

System 200 may also implement UCA rules (as described herein above) based on areas. For example, WCA developer 64 may define a set of UCA rules which automatically apply user changes of data/content while retaining design and position vendor changes (i.e. design and position used in the new "official" W2 version).

Regarding the updating of layout/design/structure vs. code, system 200 may provide multiple options. For example, system 200 may allow the user to choose whether to retain the previous look and feel, merge with the new look, or snap to the official look and feel. UCA rules may specify that some of these options may not be available (e.g. the version breaks the code compatibility, or are otherwise too significant to skip, so the user is required to move over to the new design).

Change applier 3738 may also use dynamic layout (as described in U.S. Pat. No. 10,185,703) to support merging of modified WCA elements (e.g. by rearranging the layout in order to support insert, deleted and modified sub-components).

Thus, once difference analyzer 37361 has determined the two change sets, change applier 3738 may apply any combination of the methods above (such as the use of UCA rules) to determine which of the changes in either set to apply, in what order (as the changes may not be transitive), conflict resolver 37362 may handle conflicts and change applier 3738 may generate the merged WCA instance (W2a in the example above) to be placed in the page, replacing W1a.

It will be appreciated that a single web site or application (and in fact a single page) may contain multiple instances of one or more WCAs, and that the update/merging process may result in a different configuration of the merged WCA (the W2a above) replacing each WCA instance.

It will be appreciated that an embodiment of system 200 may provide feedback to the WCA developer 64 on actual changes done to the WCA by its users, so he can see what needs to be done when changing to improve backward compatibility. This may include allowing the WCA developer 64 to test potential WCA updates against the actual changes made by site designers 62, in order to see how much functionality might be broken by the update and provide compatibility guidance.

Feedback provider 374 may gather information and provide analysis on such WCA instance changes according to user parameters (e.g. geography, experience level), site parameters (size, WCA popularity, specific WCA params given, premium package type, . . . ), site use info (# of users, site ranking/popularity, business type/family, site business volume, actual viewer access to the WCA, . . . ) and more. This information may be retrieved from CMS 50 accordingly via WCA CMS coordinator 350.

It will be appreciated that the analysis of the detected conflicts or collisions may be multi-faceted, and may include for example any of the following (some of which may be types of merge conflicts as discussed herein above): design/visual collisions, e.g. a WCA user has modified the WCA in an instance by adding a new component (occupying a certain unused area of the widget WCA), and WCA developer 64 would also like to add a component in the same or overlapping unused area. The analysis may also be functionality related and API related, e.g. checking for conflicts that are not visual in nature (element X overlaps elements Y), but result from updates that break the existing API, or otherwise break specific functions performed by the WCA. For example, an advanced user may change the API between two sub-elements of the WCA, and an update to the WCA can contain a different (and conflicting) change to the same API.

Feedback provider 374 may also employ clustering analysis using a standard clustering algorithm in order to build one or more variants of "this is how the average modified WCA looks like". Feedback provider 374 may also filter and unify changes, e.g. filter out mere layout changes (moving/resizing components) which are less likely to create version incompatibility.

As discussed herein above, system 200 may also employ ghosting and masquerading techniques. These may be applicable when site designer 62 changes a WCA element or component which immediately causes a break in code or when an update from WBS vendor 61 causes a break. Ghost module 375 and masquerader 376 may compensate for these breaks once they have been made.

Ghosting represents the ability of WCA module 300 (i.e. multiple parts such as WCA site viewer 320, in-site editor 330 and others directed by ghost module 375 as described in more detail herein below) to run the code of a WCA and ensure it works even if sub-components have been removed from a specific WCA instance. For example, the user may have removed the "play" button from the video player instance, but the WCA code will continue to work against a "ghost" version of that component, even though it is not present in the actual WCA instance.

As discussed herein above, a designer 62 using the WCA (when building a site) may update the WCA at the instance level, and such updates may include removal of internal WCA components. Ghost module 375 may ensure that code functionality is retained despite such changes by simulating (also known as "ghosting") a removed (typically internal) component as described in more detail herein below. Ghost module 375 may also perform this across the level of containment or WCA nesting. For example, a WCA A may include a WCA AB. A site designer 62 may deploy WCA A in his site W but remove WCA AB inside it. Ghost module 375 may provide the required simulation so that WCA A (and the containing site W) may continue to function properly. This would also occur even with an additional level of WCA nesting.

It will be appreciated that in some scenarios, the WCA developer 64 may encapsulate the WCA code, forbidding designers 62 from accessing or changing this code (e.g. to prevent cases in which the designer will break this code, to prevent access to trade secrets or access keys detailed in the code or for some other reasons).

In other scenarios, the WCA developer 64 may open the WCA code for updates by designer 62, and designer 62 may be able to update the WCA's code in parallel with the changes to the components included in the WCA. However, even in these cases, designer 62 may refrain from updating the code (since he may lack the skills to do so).

In some scenarios, discrepancies between the WCA structure and the code may arise, e.g., when a WCA X refers to a component C which does not exist in the WCA X component set. This could occur (for example) because the designer 62 has deleted component C in WCA X or because a changed version v2 of the code for WCA X has been installed replacing the existing v1 code (without updating X's component set in parallel), and the v2 code uses a new component C added in v2 to the existing X component set.

This could also occur with multiple components simultaneously, i.e., ghost module 375 may be required to ghost multiple components in the same WCA. Under this process, ghost module 375 may simulate some of the behaviors of such missing components, allowing the code referring to them to continue working even if the component(s) themselves are missing.

For example, the code embedded in a WCA may assume the existence of a (now missing) image sub-component XX, and set its source via a code statement such as:

XX.image.source="xx.jpg";

Ghost module 375 may use the WCA general definition to determine what to do (if the image component was removed), and does not have to rely just on the information available in the WCA instance. Ghost module 375 may also use additional sources of information, such as the site experience (i.e. the actual behavior and usage history of the WCA stored in CMS 50) as discussed in more detail herein below.

As another example, when trying to use the value of a component that has been deleted in the current instance, ghost module 375 may use a default value from the original WCA definition, even if such value is not generally shown to the user in the field.

Ghost module 375 may also have substantial information about the missing component from the original WCA, the site itself and possibly from explicit hints specified by WCA developer 64. Ghost module 375 may also use editing history and business intelligence (for the current site and possibly other sites, such as sites using the same WCA). Ghost module 375 may also employ AI techniques to analyze such collected information. For example, system 200 may train an AI model on the behavior of a given component, i.e. what outputs it produces and under what conditions (given specific inputs or otherwise) it functions. Such a model may be trained with context information (e.g. details about the containing WCA and site), user parameters, site parameters and other information in CMS 50. The AI model may then provide the information needed to drive the simulation of the ghosted component (input responses, excepted outputs etc.).

It will be appreciated that such derived information and behavior created for the (now deleted) component may include the missing component type, its properties, its default value, and default behavior. It can also include any of the component's edit-time attributes (data, layout, design), and run-time API (properties, functions, events).

Ghosting is typically performed as part of the editing process, as this is the point at which associated code is created which may use missing components. In a typical embodiment, ghost module 375 creates a "model" (representing the site elements) for the associated code to work against.

When a ghost element is required, ghost module 375 may fetch the original definition, structure, and attributes of a missing element and may simulate how some of the APIs work so that they remain coherent (e.g. missingElement.hide( ) will return as if the element was successfully hidden).

Ghost module 375 may retrieve the required information from a number of sources such as the original "master copy" (i.e., the "factory settings" pre-modification WCA as provided by WCA developer 64), the actual version of the component and the data that was in the component on the site before it was deleted or a merged version of the two.

In an alternative embodiment, ghost module 375 may provide the component's behavior based on gathered data about it (including observing behavior during run-time on various instances of the relevant WCA and simulated component).

In a function related to ghosting, system 200 may provide a user interface allowing the WCA user to re-establish components deleted from a WCA. Thus, the user may select WCA components deleted in the current WCA instance, and return them into the WCA based on their "factory settings" or on the setting and content used by the components when deleted.

Masquerader 376 may provide the ability for a component of a given type to behave as a component of another type, known as "masquerading". Masquerader 376 may therefore safeguard compatibility between an element that has been replaced and the element replacing it as required (e.g., by the replaced element's environment).

An example is a user changing the type of an internal WCA component from type A to type B (e.g., changing gallery type from a slider gallery to a matrix gallery). Another example would be replacing a picture gallery component with a database component which may not have the gallery display, but can still provide the "list of items" functionality.

Masquerader 376 may provide a translation facility for interaction between various elements in system 200 and component types, such as using specific translation drivers provided by the code implementing the two gallery types (in the example above). Thus masquerader 376 may provide the B-type component (the new type) with the ability to masquerade as an A-type component (the old type) for some or all relevant interactions. Such translation drivers may translate the input and output messages and events implemented by the various components, and may also implement common or standardized message and event format. In the example above, masquerader 376 may define a set of common gallery message and event formats, and may use specific translation drivers in order to let the gallery components masquerade as gallery components of other types. Masquerader 376 may perform additional translation and modification of translated messages and events based on parameters and information related to the containing WCA and site, user parameters and other system information in CMS 50.

In addition to explicit type change by the user, masquerader 376 may provide interaction translation capabilities for other cases in which a component may be required to function (masquerade) as though it was another related component. Examples may include two components that are related via their defined role (e.g. an image and a button may both be assigned the role 'playButton') and two components that are related by inheriting a common functionality or set of capabilities from a common ancestor, e.g. components X and Y which both support the capabilities of 'ProductGallery' though inheritance (even though they are otherwise different).

As discussed herein above, ML/AI module 379 and in particular element behavior ML/AI module 3794 may provide support for the functionality of ghost module 375 and masquerader 376 by learning component and code behaviors and providing the required component/code behaviors and information translation.

Reference is now made to FIGS. 13A to 13E which illustrate an example user interface for manipulation of WCAs inside WCA site in-editor 330 as part of the Wix platform by Wix.com, Ltd.

Figure 13A:
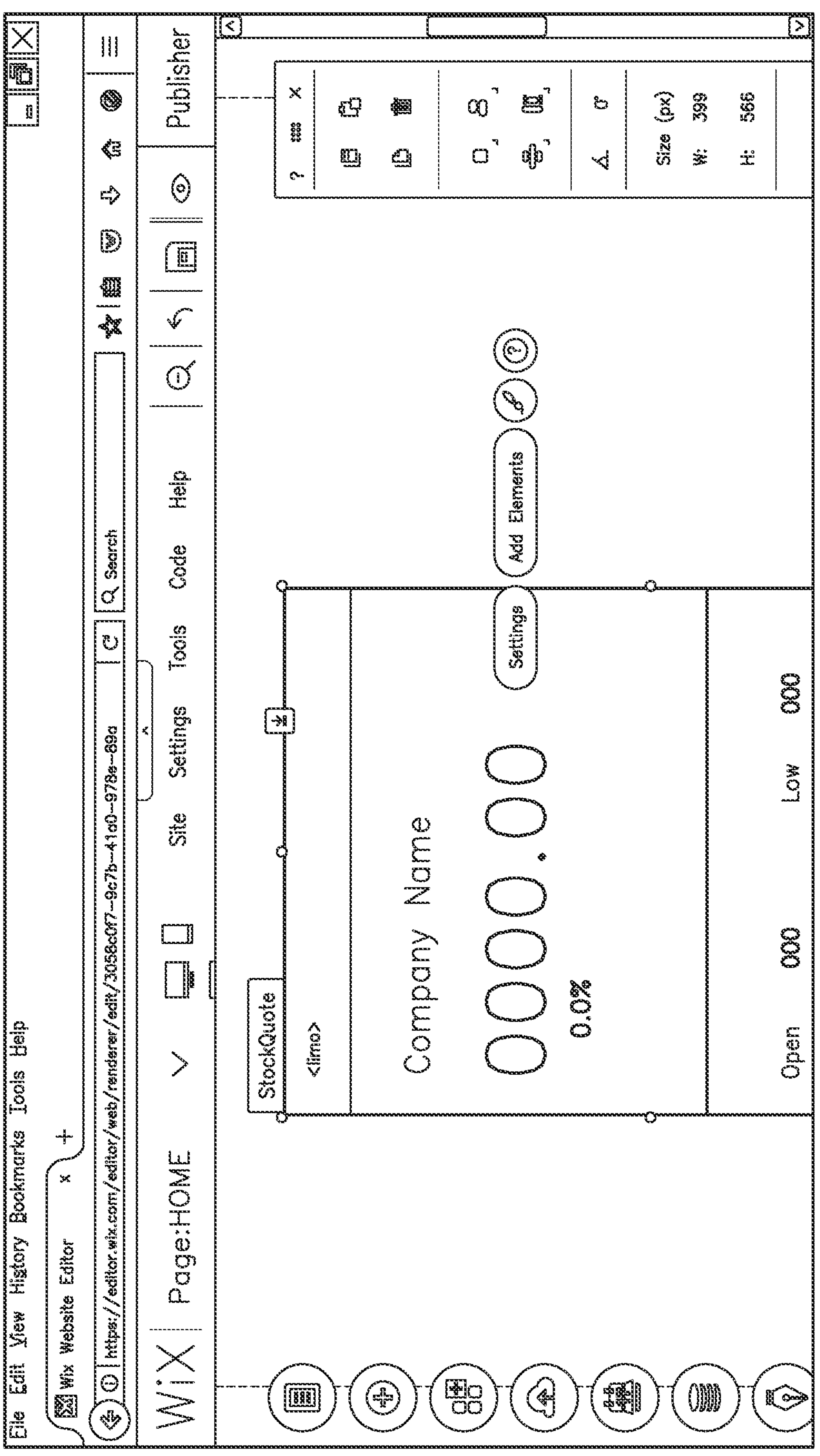
FIGS. 13A-13E are schematic illustrations of implementations of WCAs, constructed and operative in accordance with the present invention.

FIG. 13A illustrates a sample stock chart WCA.

Figure 13B:
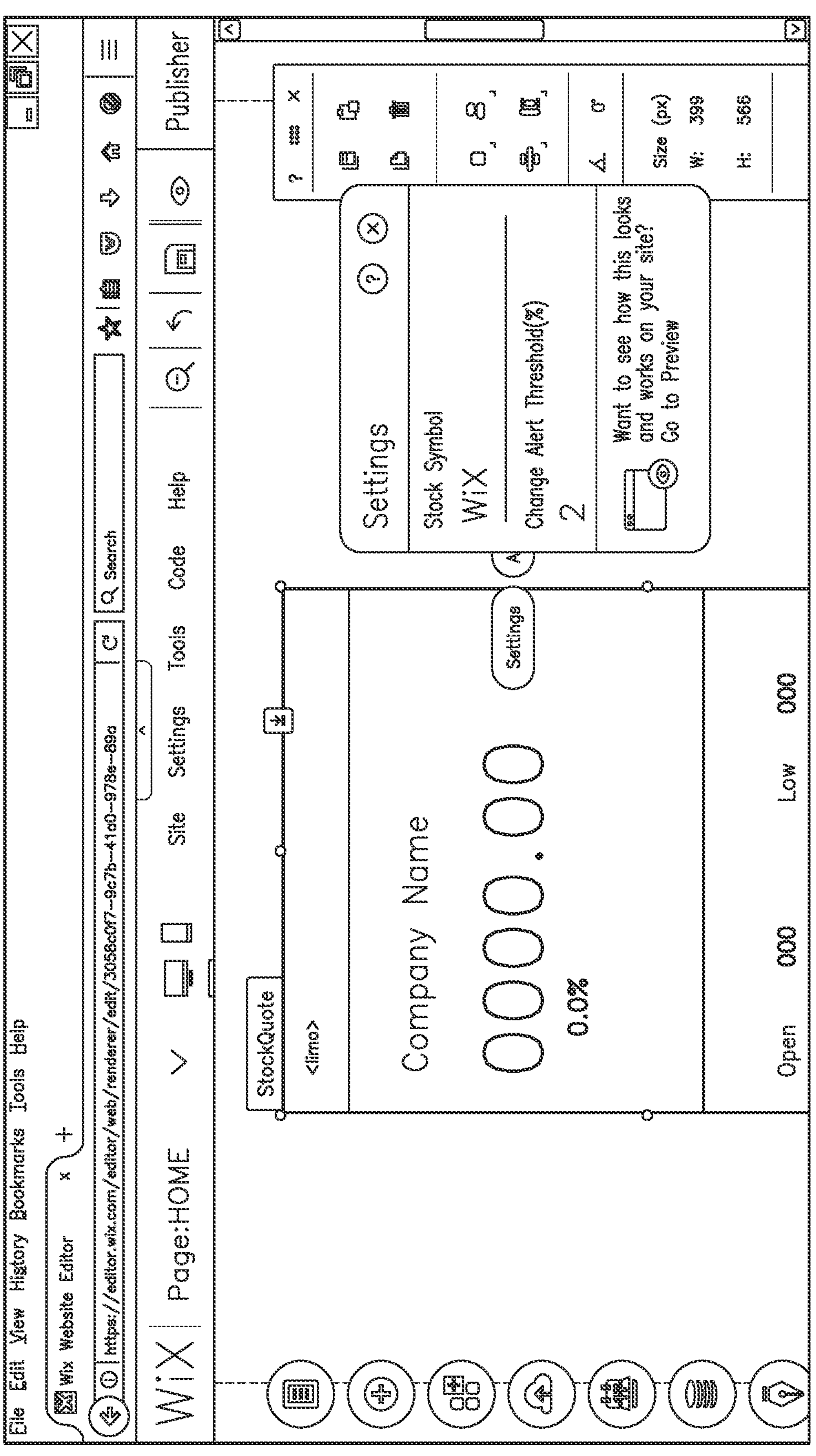

FIG. 13B illustrates a sample stock chart WCA with a WCA-specific setting dialog open, allowing site designer 61 to specify the stock symbol (WIX) and the change alert threshold (2%) to be used by this WCA.

Figure 13C:
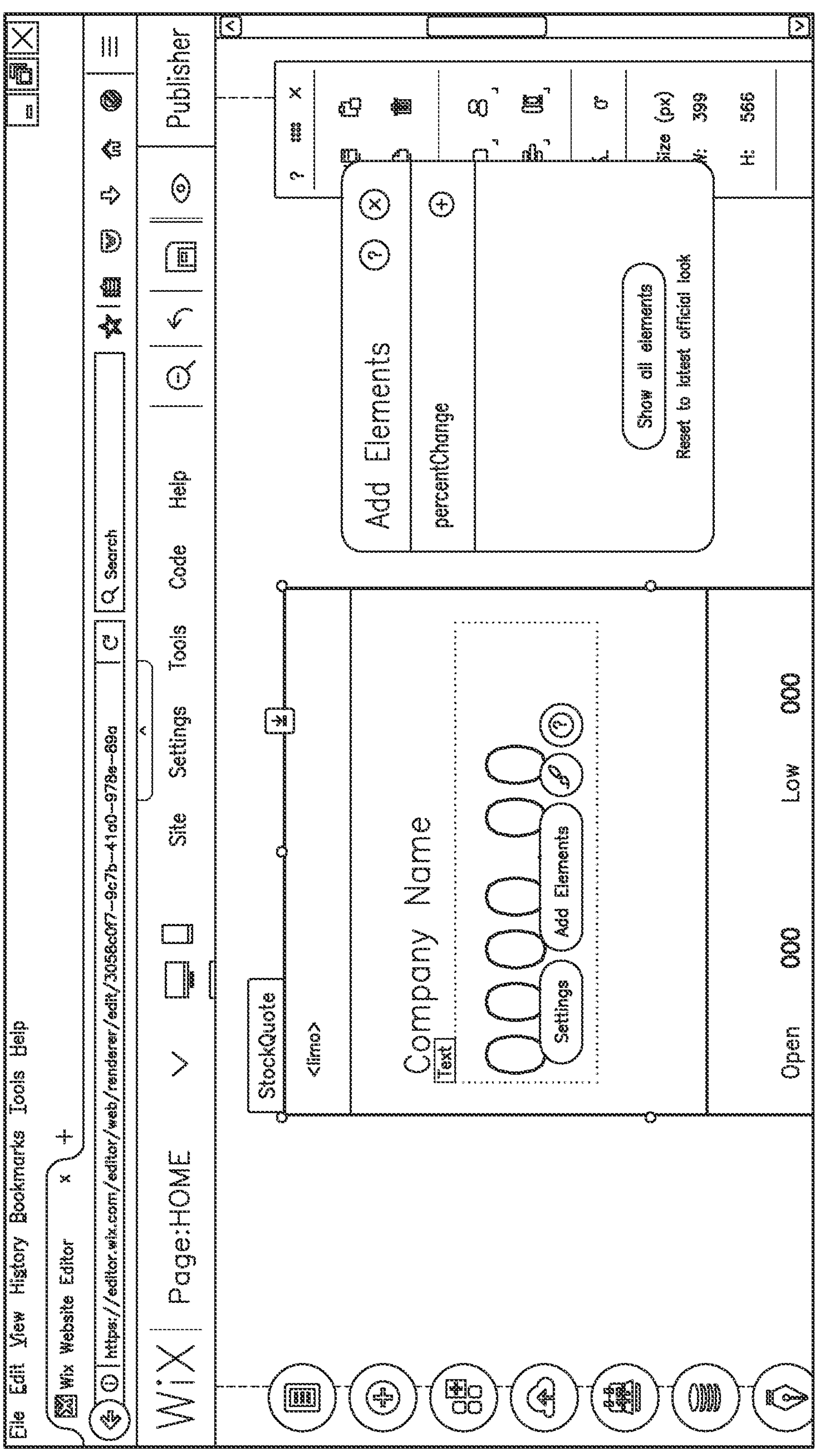

FIG. 13C illustrates a sample stock chart WCA in which the "percentChange" sub-component has been deleted, and the "Add elements" dialog has been opened, allowing the deleted element to be restored, or the latest official look to be applied.

Figure 13D:
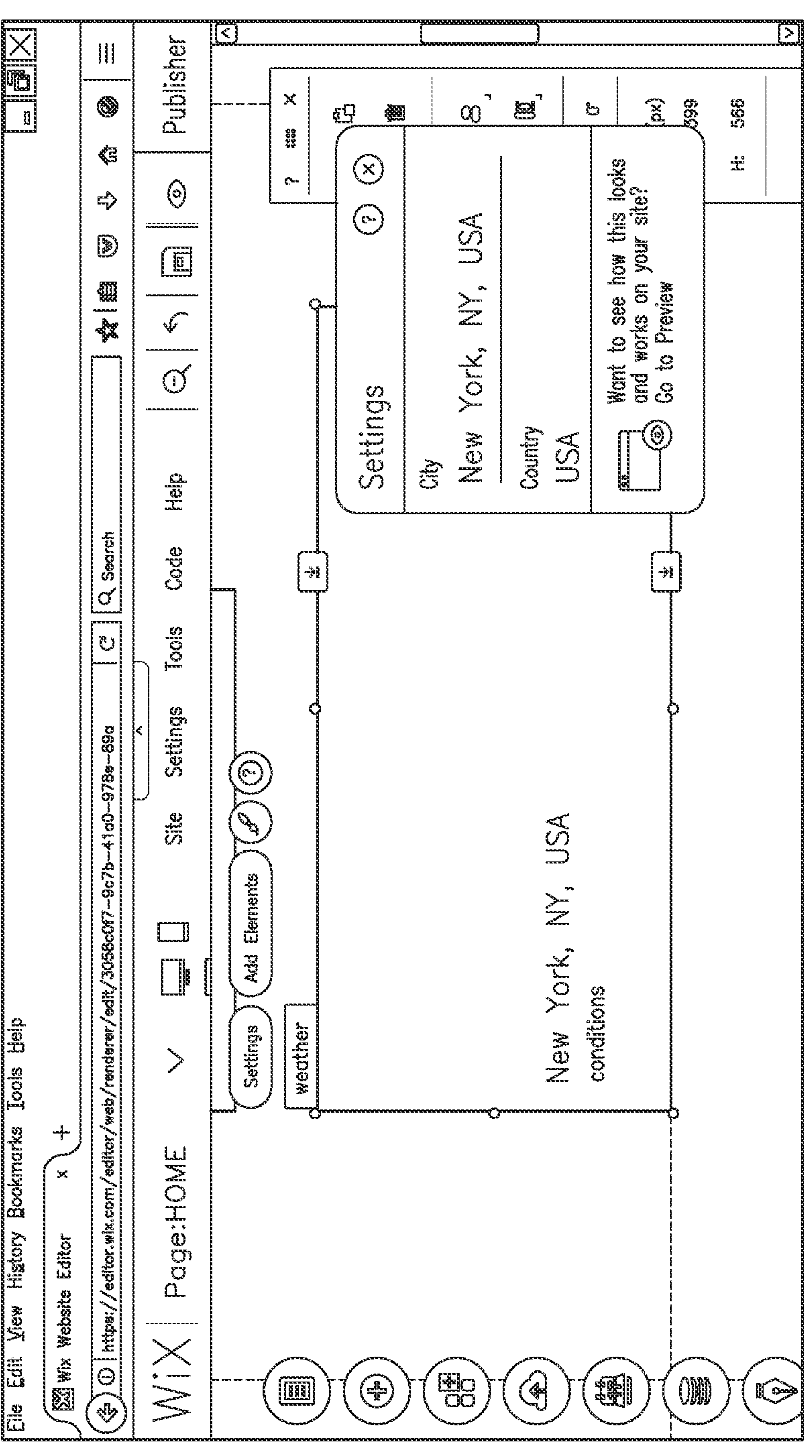

FIG. 13D illustrates a sample weather WCA with its own WCA-specific setting dialog open (including city and country).

Figure 13E:
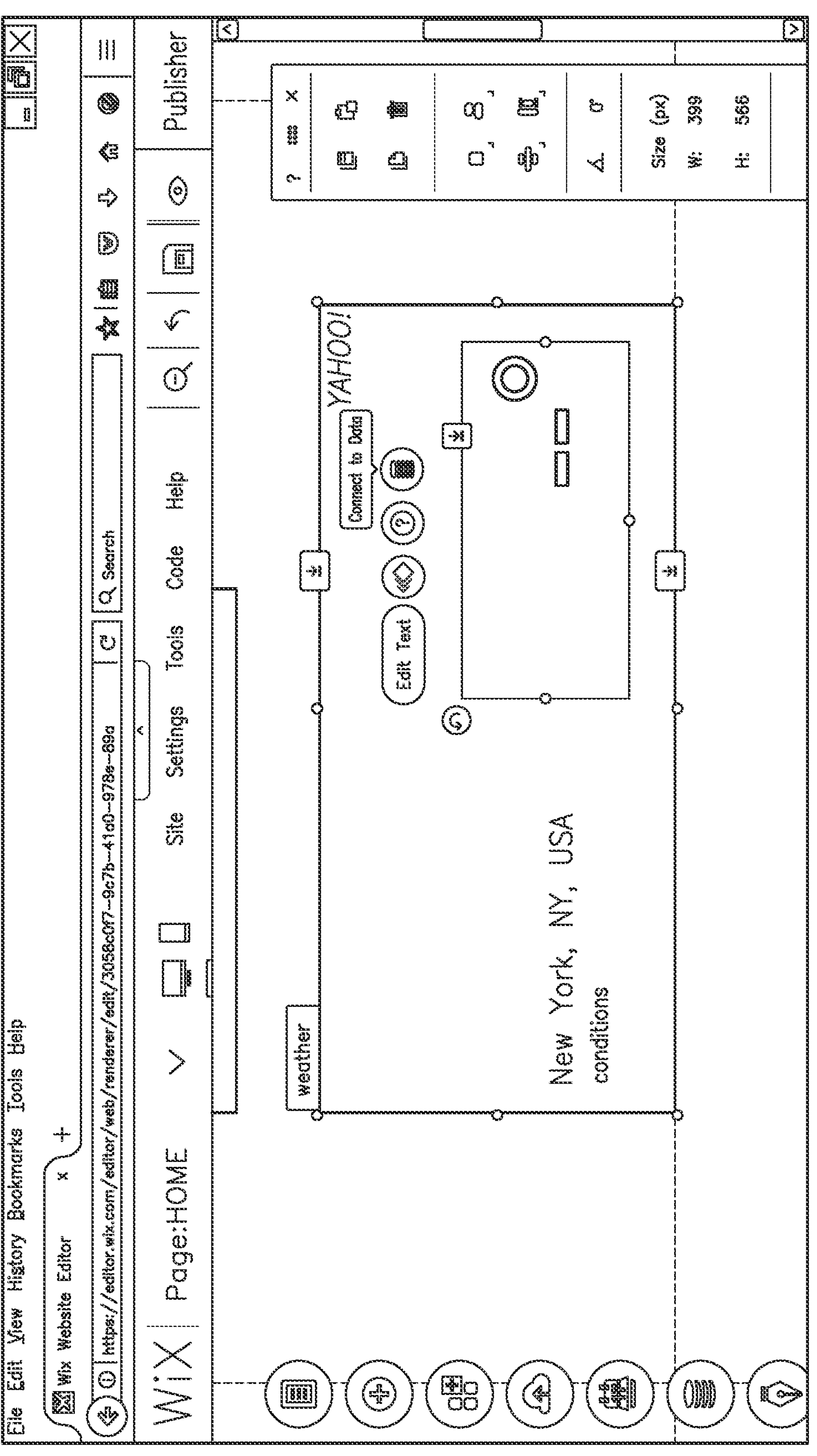

FIG. 13E illustrates a sample weather WCA in which the focus is on the text field displaying the temperature. The text field has the regular "edit text" options, as well as a "connect to data option".

As discussed herein above, WCA developer 64 may establish (by setting the appropriate UCA rules) if a new WCA version is a regular version (which may be modified through user changes) or a major upgrade which is not backward compatible with the previous WCA version. A major upgrade may force the WCA user (i.e. site designer 62) to return to an unmodified "factory settings" WCA version (based on the new version in this case).

In some scenarios, the user may select to update the code from version 1 to version 2 without updating the structure (i.e. leaving the structure at version 1 or at a modified version 1a). As the version 1 structure is not changed, the WCA may be missing some elements of the version 2 structure. In such a case, ghost module 375 may click-in, providing ghosted fields that are required by the version 2 code. Thus, the code can reference the missing components;

It will be appreciated that the gathering of information for ghosting is also useful during the WCA building and testing phases by the WCA developer 64. The WCA designer may want to preview and run the WCA code while building the WCA, and in an alternative embodiment, system 200 may provide a testing environment for WCA's.

The ability of system 200 to collect information about the specific interactions made by WCA sub-components may allow WCAs to be realistically tested. Such testing may include streams of interactions associated with the sub-components, as well as other environmental aspects which will determine how the WCA will run (what user is logged in, with what role, geographic location, etc.)

System 200 may allow the user to provide such interaction and environmental information via WCA in-site editor 330 or WCA app builder 360 may generate appropriate values in order to test the WCAs using additional or alternative data.

WCA in-site editor 330 and WCA app builder 360 may also provide support for creating database connections during editing by offering potential fields in the pertinent database to connect to via data mining of the possible field options. Database connector 377 may check for field types and previous connections made by the same user or other users of the same WCA. This may be done at the WCA creation by WCA developer 64. WCA designer 62 may also bind an element in the WCA to the value of a property passed into it. For example, the property 'city name' may be bound to the element in weather WCA showing the name of the city. WCA designer 62 may also bind an element in the WCA to data from a database that is also packaged and installed with the WCA (also known as a "collection"). This may be done during WCA usage time by the user.

The WCA user may bind the properties of a WCA to a value from the database, so that value is passed into the WCA when it runs. For example, a website may have a dynamic page showing a city's details, and the city property of the weather WCA placed on that page is bound to the city name in the site's database.

As discussed herein above, some databases known as collections, may be bundled with the WCA itself. Collections are typically the smaller databases, as larger databases may typically be served from the website building system server, the WCA provider server, or a separate external server and cannot be included in the displayed page.

Therefore the database may be specific to the installed WCA instance, i.e., a separate copy may exist for each WCA instance. The database could be included in the page containing the WCA (this typically happens for smaller WCAs). The database could also be specific to the website (or a set of related websites) and thus shared between multiple instances of the WCA in the same website (or related sites) or be generic to the WCA and accessible by multiple instances of the WCA, possibly from multiple unrelated websites.

Database connector 377 may track the amount of data in a given database, recommend the user to convert an (internal) collection to an (external) database, or vice versa and provide seamless conversion in both directions.

As discussed herein above, the WCA may be characterized by an API that accesses its functionality. API handler 378 may allow a WCA user to switch between multiple WCAs which have identical (or similar) APIs. System 200 may typically provide a default implementation or version of the WCA, and may also offer alternative WCAs (e.g. through object marketplace 15).

WCA Appstore Manager 315 may combine such a selection by API conformance with selection by other WCA parameters when searching through the App Store of system 200 (or another object marketplace 15 embodiment), such as fit to the containing page (based on design/style matching or other parameters).

For example, the creators of a store-front e-commerce vertical may include a specific product WCA to display product details. A site designer 62 using the vertical application may locate an alternate product widget which can be used interchangeably with the original one as long as the relevant API calls exist in both.

Thus a WCA comprising all different types of sub elements and code, may be copied, modified and manipulated. It may have different versions merged and may have the ability to continue functioning after elements/code are removed or changed by using ghosting and masquerading techniques.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type, such as a client/server system, mobile computing devices, smart appliances, cloud computing units or similar electronic computing devices that manipulate and/or transform data within the computing system's registers and/or memories into other data within the computing system's memories, registers or other such information storage, transmission or display devices.

Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general purpose computers may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A website building system (WBS), the system comprising:

at least one processor;

at least one database storing at least definitions and instances of WBS configurable applications (WCAs), wherein said WCAs are single packaged entities comprising sets of customizable elements having components of said WBS embedded as an instance in a page of a website of said WBS to provide operations; and a WCA app builder running on said at least one processor to enable a WCA developer to build and edit a first version WCA, said WCA app builder further comprising:

a customization panel creator to configure and generate associated specific customization panels for said first version WCA of displayable during editing, said panels containing customizable elements for WCA customization to configure an instance of said first version WCA of WCA;

a dialog editor to enable the creation and editing of definitions for said customizable elements;

a WCA analyzer to analyze said customizable elements to determine at least one of: repeating or hierarchical elements in the structure of said first version WCA to generate at least one of lists and nested elements; and a WCA handler configured to, in response to a modification of said first version WCA comprising at least one of: a replacement of a first component with a second component and a deletion of a third component, to perform at least one of:

translating at least one of input messages or events between said second component and elements of said WBS and simulating at least a portion of the functionality of said deleted third component to maintain operational compatibility.

2. The system according to claim 1 wherein said customization panel creator and said dialog editor modify the UI (user interface) of a WBS editor for said WCA developer.

3. The system according to claim 1 and further comprising:

an in-site editor to provide specific editing capabilities for said WCA developer to edit at least one of a definition or an instance of said first version WCA;

said WCA handler to receive at least one modification to said first version WCA from a user of said WBS and at least one update to said first version WCA from said WCA developer, said WCA handler to merge at least between said at least one modification and said at least one update to create a changed WCA, said WCA handler to also resolve conflicts or loss of functionality and to handle permissions between said at least one modification and said at least one update; and a WCA site viewer to support viewing of said first version WCA and said changed WCA during runtime of said WBS.

4. The system according to claim 3 and also comprising at least one of:

a WCA modification handler to receive and resolve said conflicts between said at least one modification and said at least one update for said first version WCA;

a machine learner (ML)/artificial intelligence (AI) module to employ machine learning and artificial intelligence techniques to provide support for resolution of said conflicts and said loss of functionality for said WCA handler and to provide merging support for said WCA modification handler;

an Application Programming Interface (API) handler to replace at least said first version WCA with at least one other WCA having an identical or similar API;

an alert provider to provide alerts regarding implementation and use of said WCA handler;

a feedback provider to gather information and provide analysis on general WCA instance changes; and a database connector to check for field types and previous connections made by said user or other users of said first version WCA.

5. The system according to claim 4 wherein said WCA modification handler comprises:

an update receiver to receive said at least one modification and said at least one update to said first version WCA;

an API analyzer to analyze the pre-packaged API of an existing WCA to detect the API properties and interfaces and to generate a matching settings panel for a changed version of said existing WCA;

a WCA merger to merge said at least one modification and said at least one update to create said changed WCA from said first version WCA;

a change resolver to resolve said conflicts between said at least one modification and said at least one update;

a permission determiner to determine and apply any permission restrictions for said at least one modification and said at least one update and to determine any permissions required at runtime for said changed WCA; and a change applier to apply said at least one modification and said at least one update to said first version WCA according to said WCA merger, said change resolver and said permission determiner to create said changed WCA.

6. The system according to claim 3, and also comprising:

a WCA manager to provide management services for said first version WCA and said changed WCA within said WBS;

a WCA CMS (content management system) coordinator to access at least said WBS components and user information also stored in said at least one database; and said WCA handler to coordinate activity between said WCA app builder, said WCA manager, said WCA site viewer, said providing specific editing capabilities and said WCA CMS coordinator.

7. The system according to claim 6 wherein said user information is at least one of: geographical location, language, editing history and collected business intelligence for said WBS user.

8. A method for a website building system (WBS), the method comprising:

storing in at least one database at least definitions and instances of WBS configurable applications (WCAs), wherein said WCAs are single packaged entities having components of said WBS are embedded as an instance in a page of a website of said WBS, said WCAs to provide operations for said website; and enabling a WCA developer to build and edit a first version WCA, said enabling comprising:

configuring and generating associated specific customization panels for said first version WCA displayable during editing, said panels containing customizable elements for WCA customization to configure an instance of said first version WCA;

creating and editing of definitions for said customizable elements; and analyzing said customizable elements to determine at least one of: repeating or hierarchical elements in the structure of said first version WCA to generate at least one of: lists and nested elements; and in response to a modification of said first version WCA comprising at least one of: a replacement of a first component with a second component and a deletion of a third component, performing at least one of:

translating at least one of input messages or events between said second component and elements of said WBS and simulating at least a portion of the functionality of said deleted third component to maintain operational compatibility.

9. The method according to claim 8 wherein said configuring and generating associated specific customization panels and said creating and editing of definitions modify the UI (user interface) of a WBS editor for said WCA developer.

10. The method according to claim 8 and further comprising:

providing specific editing capabilities for said WCA developer to edit at least one of a definition or an instance of said first version WCA;

receiving at least one modification to said first version WCA from a user of said WBS and at least one update to said first version WCA from said WCA developer;

merging at least between said at least one modification and said at least one update to create a changed WCA;

resolving conflicts or loss of functionality and handling permissions between said at least one modification and said at least one update; and supporting viewing of said first version WCA and said changed WCA during runtime of said WBS.

11. The method according to claim 10 and also comprising at least one of:

receiving and resolving said conflicts between said at least one modification and said at least one update for said first version WCA;

employing machine learning and artificial intelligence techniques to provide support for resolution of said conflicts and loss of functionality for retaining code functionality and said operational compatibility and to provide merging support for said receiving and resolving said conflicts;

replacing at least said first version WCA with at least one other WCA having an identical or similar API;

providing alerts regarding implementation and use of said merging and resolving;

gathering information and providing analysis on general WCA instance changes; and checking for field types and previous connections made by said WBS user or other users of said first version WCA.

12. The method according to claim 11 wherein said receiving and resolving said conflicts comprises:

analyzing the pre-packaged API of an existing WCA to detect the API properties and interfaces and generating a matching settings panel for a changed version of said existing WCA;

merging said at least one modification and said at least one update to create said changed WCA from said first version WCA;

resolving conflicts between said at least one modification and said at least one update;

determining and applying any permission restrictions for said at least one modification and said at least one update and determining any permissions required at runtime for said changed WCA; and applying said at least one modification and said at least one update to said first version WCA according to said merging said at least one modification and said at least one update, said resolving conflicts and said determining and applying any permission restrictions to create said changed WCA.

13. The method according to claim 10, and also comprising:

providing management services for said first version WCA and said changed WCA within said WBS;

accessing at least said WBS components and user information also stored in said at least one database; and coordinating activity between said enabling a WCA developer to build and edit, providing management services, said supporting viewing, said providing specific editing capabilities and said accessing at least said WBS components.

14. The method according to claim 13 wherein said user information is at least one of: geographical location, language, editing history and collected business intelligence for said WBS user.

* * * * *